(12) United States Patent
Ooi et al.

(10) Patent No.: US 7,388,822 B2
(45) Date of Patent: Jun. 17, 2008

(54) LIQUID CRYSTAL LENS ELEMENT AND OPTICAL HEAD DEVICE

(75) Inventors: Yoshiharu Ooi, Chiyoda-ku (JP); Hiromasa Sato, Koriyama (JP); Ryuichiro Shimizu, Koriyama (JP); Takuji Nomura, Koriyama (JP); Yuzuru Tanabe, Chiyoda (JP); Mitsuo Oosawa, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/498,076

(22) Filed: Aug. 3, 2006

(65) Prior Publication Data

US 2006/0280100 A1    Dec. 14, 2006

Related U.S. Application Data

(63) Continuation of application No. PCT/JP2005/001528, filed on Feb. 2, 2005.

(30) Foreign Application Priority Data

Feb. 3, 2004 (JP) ............................. 2004-026685
Aug. 6, 2004 (JP) ............................. 2004-230606

(51) Int. Cl.
*G11B 7/00* (2006.01)
(52) U.S. Cl. ................. 369/112.02; 369/44.32
(58) Field of Classification Search ............ 369/112.02
See application file for complete search history.

(56) References Cited

U.S. PATENT DOCUMENTS

2002/0036958 A1* 3/2002 Wada et al. ............. 369/44.23

FOREIGN PATENT DOCUMENTS

JP    4-280222 A    10/1992

(Continued)

*Primary Examiner*—William Korzuch
*Assistant Examiner*—Jorge L. Ortiz-Criado
(74) *Attorney, Agent, or Firm*—Oblon, Spivak, McClelland, Maier & Neustadt, P.C.

(57) ABSTRACT

A liquid crystal lens element having a lens function is provided, which is small sized without having moving part, and which can stably carry out correction of spherical aberration containing a power component corresponding to focal point change of incident light.

A liquid crystal lens element which changes a focal length of light transmitted through a liquid crystal 16 according to the magnitude of the voltage applied to the liquid crystal 16 sandwiched between a pair of transparent substrates 11 and 12, which comprises transparent electrodes 13 and 14 provided on the respective transparent substrates 11 and 12 for applying a voltage for the liquid crystal 16, and a concave-convex portion 17 having a saw-tooth-shaped cross-sectional shape having a rotational symmetry about an optical axis and formed on one surface of the transparent electrode 13 with a transparent material, wherein at least concave portions of the concave-convex portion 17 are filled with the liquid crystal 16 so as to change the substantial refractive index of the liquid crystal 16 according to the magnitude of applied voltage.

9 Claims, 10 Drawing Sheets

FOREIGN PATENT DOCUMENTS

| | | |
|---|---|---|
| JP | 5-205282 A | 8/1993 |
| JP | 8-278477 A | 10/1996 |
| JP | 9-189892 A | 7/1997 |
| JP | 9-230300 A | 9/1997 |
| JP | 10-48597 A | 2/1998 |
| JP | 10-143903 A | 5/1998 |
| JP | 2001209966 A * | 8/2001 |
| JP | 2002-352470 A | 12/2002 |
| JP | 2003-115127 A | 4/2003 |
| JP | 2003-149443 A | 5/2003 |
| JP | 2004-191715 A | 7/2004 |

* cited by examiner

Fig.3
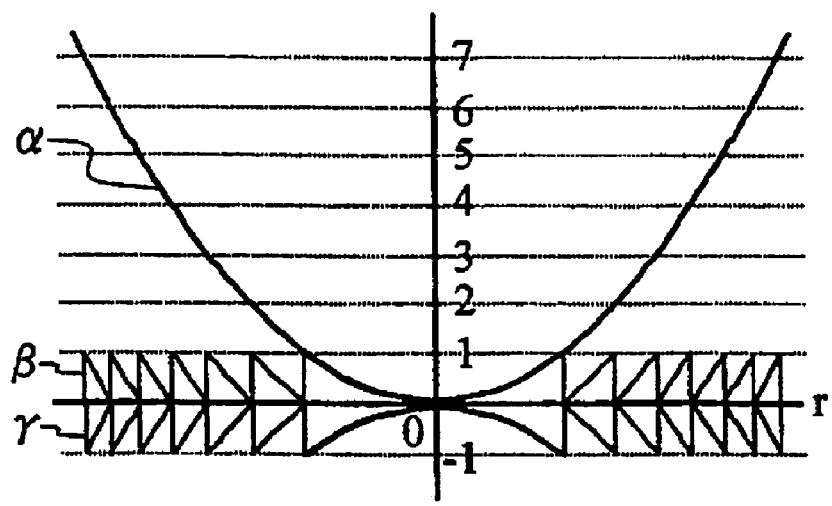
Optical path difference OPD (λ)
Fig.4(A) V₊₁
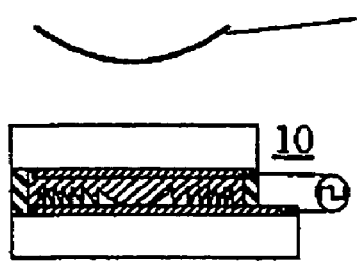
Transmission wavefront
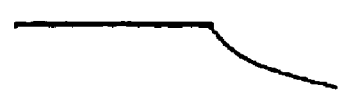
Incident wavefront

Fig.4(B) $V_0$
Transmission wavefront
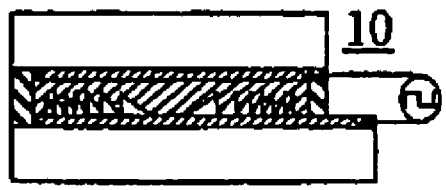
Incident wavefront
Fig.4(C) $V_{-1}$
Transmission wavefront
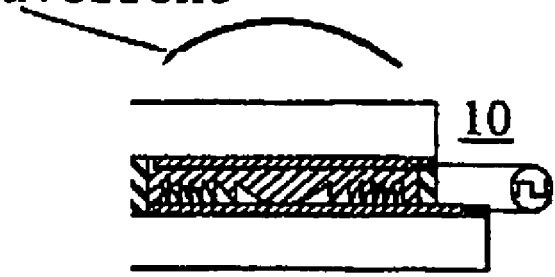
Incident wavefront ns822 B2

LIQUID CRYSTAL LENS ELEMENT AND OPTICAL HEAD DEVICE

TECHNICAL FIELD

The present invention relates to a liquid crystal lens element and an optical head device, in particular, to a liquid crystal lens capable of switching the focal length among a plurality of different focal lengths according to a magnitude of applied voltage, and an optical head device employing the liquid crystal lens, for writing and/or reading an information to/from an optical recording medium.

BACKGROUND ART

As examples of an optical recording medium (hereinafter referred to as "optical disk") having an information recording layer formed on a surface of light-incident side, and a transparent resin covering the information recording layer, e.g. optical disks for CD and optical disks for DVD are widely used. Further, in an optical head device for writing and/or reading an information to/from the optical disks for DVD, one employing a laser diode of 660 nm wavelength band as a light source and an objective lens having a NA (numerical aperture) of from 0.6 to 0.65, are employed.

Heretofore, an optical disk for DVD commonly used (hereinafter referred to as "single layer optical disk"), has a single information recording layer and a cover layer of 0.6 mm thick. However, in recent years, in order to increase information amount in each optical disk, an optical disk (read-only type or readable-writable type) having two information recording layers (hereinafter referred to as "double layer optical disk") has been developed, and in the double layer optical disk, information recording layers are formed at positions corresponding to cover thicknesses of 0.57 mm and 0.63 mm in the light-incident side.

Thus in a case of writing and/or reading to/from a double layer optical disk by using an optical head device having an objective lens optimally designed to have zero aberration for a single layer optical disk, when a cover thickness is different, a spherical aberration is generated according to the difference of the cover thickness and convergence of incident light to an information recording layer is deteriorated. In particular, in a case of double-layer optical disk of writing type, deterioration of convergence corresponds to decrease of converging power density, which causes a writing error, such being a problem.

In recent years, in order to improve recording density of an optical disk, an optical disk having a cover thickness of 0.1 mm (hereinafter it is also referred to as "optical disk for BD") is also proposed. Further, an optical head device for writing an information to such an optical disk, employs a laser diode emitting laser light of 405 nm wavelength band and an objective lens having a NA of 0.85. However, also in this case, with respect to a double layer optical disk of recording type, a spherical aberration generated corresponding to the difference of the cover thickness, causes a writing error, such being a problem.

Heretofore, as means for correcting a spherical aberration caused by the difference of the cover thickness of e.g. the above-mentioned double layer optical disk, a method of employing movable lens group or a liquid crystal lens, has been known.

(I) For example, in order to carry out correction of spherical aberration by using a movable lens group, an optical head device 100 shown in FIG. 16 for writing and/or reading an optical disk D, has been proposed (for example, refer to Patent Document 1).

The optical head device 100 comprises a light source 110, an optical system 120 of various types, a photo-acceptance element 130, a control circuit 140 and a modulation/demodulation circuit 150, and further, a first and a second movable lens groups 160 and 170. Further, the first movable lens group 160 includes a concave lens 161, a convex lens 162 and an actuator 163, which exhibits a focal-length variable lens function that a power of the movable lens group 160 is continuously changeable from positive (convex lens) to negative (concave lens) by moving the convex lens 162 fixed to the actuator 163 in an optical axis direction.

By disposing the movable lens group 160 in an optical path to an optical disk D, it becomes possible to correct a spherical aberration containing a power component and to adjust a focal point of incident light to an information recording layer (not illustrated) of the optical disk D having a different cover thickness.

However, in the case of employing the movable lens group 160, there has been a problem that the size of the optical head device 100 becomes larger since the pair of lenses 161 and 162 and the actuator 163 are required, and the mechanical design for the movement becomes complicated.

(II) Further, in order to correct a spherical aberration caused by the difference of cover thickness of an optical disk, an optical head device employing a liquid crystal lens 200 as shown in FIG. 17, has been proposed (for example, refer to Patent Document 2).

The liquid crystal lens 200 has a construction that it comprises a substrate 230 having a flat surface on which a transparent electrode 210 and an alignment film 220 are formed, a substrate 260 having a curved surface symmetric about an axis and having a surface shape $S(r)$ represented by the following formula being a sum of powers of a radius r:

$$S(r) = a_1 r^2 + a_2 r^4 + a_3 r^6 \quad (1)$$

wherein $r^2 = x^2 + y^2$ $a_1, a_2, a_3$; constant on which a transparent electrode 240 and an alignment film 250 are formed, and a nematic liquid crystal 270 sandwiched by the substrates 230 and 260.

In the liquid crystal lens 200, when a voltage is applied between the transparent electrodes 210 and 240, alignment of molecules of the liquid crystal 270 changes and the refractive index of the liquid crystal 270 changes. As a result, a wavefront of transmission light changes in accordance with refractive index difference between the substrate 260 and the liquid crystal 270.

Here, the refractive index of the substrate 260 equals to the refractive index of the liquid crystal 270 when no voltage is applied. Accordingly, when no voltage is applied to the liquid crystal, transmission wavefront is not changed from that of incident light.

On the other hand, when a voltage is applied between the transparent electrodes 210 and 240, a refractive index difference $\Delta n$ is generated between the substrate 260 and the liquid crystal 270, and a distribution of optical path difference of transmission light corresponding to $\Delta n \times S(r)$ is generated (refer to Formula (1) for $S(r)$).

Accordingly, it is possible to correct an aberration by fabricating the surface shape $S(r)$ of the substrate 260 so as to correct a spherical aberration caused by the difference of cover thickness of an optical disk D, and by adjusting the refractive index difference $\Delta n$ according to applied voltage.

However, in the case of liquid crystal lens described in FIG. 17, since the refractive index change of the liquid crystal 270 in response to applied voltage is at most about 0.3, it is necessary to increase the concave-convex height of S(r) to generate a large optical path difference distribution $\Delta n \times S(r)$ corresponding to a power component for changing a focal point of incident light. As a result, the layer of liquid crystal 270 becomes thicker, which causes problems that driving voltage increases and response becomes slower.

To cope with this problem, in order to reduce thickness of liquid crystal layer, it is effective to correct only spherical aberration requiring minimum amount of aberration correction, except for power component. However, when the substrate 260 is fabricated to have a surface shape S(r) so as to correct only spherical aberration, if the optical axis of an objective lens for converging incident light on an information recording layer of an optical disk, and the optical axis of the liquid crystal lens are not aligned to each other, a coma aberration is generated which causes a problem that convergence to the information recording layer is deteriorated and writing or reading is prevented.

(III) By the way, in order to develop a substantial lens function capable of changing also a power component corresponding to focal point change of incident light without increasing the thickness of liquid crystal layer, a liquid crystal diffraction lens 300 shown in FIG. 18 is also proposed (for example, refer to Patent Document 3).

In the liquid crystal diffraction lens 300, a transparent electrode 320 is formed on one side of a substrate 310 on which a predetermined saw-tooth-shaped relief is formed, and the transparent electrode 320 and an opposing electrode 330 sandwich a liquid crystal layer 340. When a voltage is applied between the electrodes 320 and 330, substantial refractive index of the liquid crystal layer 340 for extraordinarily polarized light changes from an extraordinary refractive index $n_e$ to an ordinary refractive index $n_o$. Here, "substantial refractive index" means an average refractive index in the thickness direction of the liquid crystal layer.

Provided that the refractive index of the substrate 310 having the saw-tooth-shaped relief structure is designated as $n_1$, and the wavelength of incident light is designated as $\lambda$, by forming the saw-tooth-shaped relief grooves so as to have a depth d satisfying the following equation:

$$d=\lambda/(n_e-n_1)$$

maximum diffracting efficiency is obtained at the wavelength $\lambda$ when no voltage is applied, and thus, a diffraction lens is formed. Further, even if the wavelength $\lambda$ of incident light is changed, application voltage can be adjusted so as to produce the maximum diffraction at the wavelength $\lambda$.

In the liquid crystal diffraction lens 300 having such a construction, since it is only necessary to fill the grooves of the saw-tooth-shaped relief with the liquid crystal layer 340, the liquid crystal layer 340 can be thinner than the liquid crystal 270 shown in FIG. 17 which is a type of liquid crystal to be used for the above-mentioned liquid crystal lens 200 to correct spherical aberration containing a power component.

However, in the liquid crystal diffraction lens 300, since the transparent electrode 320 is formed on the saw-tooth-shaped relief surface, the transparent electrode 320 tends to be disconnected at edge portions. Further, if the thickness of the liquid crystal layer 340 is reduced, the transparent electrode 320 and the opposing electrode 340 tend to form a short circuit.

Patent Document 1: JP-A-2003-115127
Patent Document 2: JP-A-5-205282
Patent Document 3: JP-A-9-189892

DISCLOSURE OF THE INVENTION

Problems to be Solved by the Invention

The present invention has been made considering the above circumstances and the present invention provides a liquid crystal lens element having a lens function, which can realize a small-sized element having no movable portion, and which can stably correct spherical aberration containing a power component corresponding to a focal point change of incident light in accordance with a magnitude of applied voltage, although the liquid crystal lens element is a liquid crystal element having a thin liquid crystal layer. Further, it is an object of the present invention to provide an optical head device which employs the liquid crystal lens element, and which corrects spherical aberration caused by a difference of the cover thickness between single layer and double layer optical disks, and thus, which can stably carry out writing and/or reading.

Means for Solving the Problems

The present invention has the following features.

1. A liquid crystal lens element having a variable focal length, comprising a pair of transparent substrates each provided with a transparent electrode, voltage application means for applying voltage between the respective transparent electrodes provided on the pair of substrates, a concave-convex portion made of a transparent material and having a cross-section of saw-tooth shape or a cross-section of saw-tooth shape approximated by steps, that have rotational symmetry about an optical axis of the liquid crystal lens element, and formed on one of the transparent electrodes, and a liquid crystal filling at least concave portions of the concave-concave portion, wherein a substantial refractive index of the liquid crystal is changed according to the magnitude of the voltage applied between the transparent electrodes by the voltage application means.

According to this construction, a transparent electrode is formed on a flat surface of a transparent substrate, and on the transparent electrode, a concave-convex portion for correcting wavefront aberration is formed. As a result, it is possible to obtain high uniformity of electric field applied to a liquid crystal layer filled with a liquid crystal, and stable operation in a plane of the liquid crystal lens element. Further, since the distance between the transparent electrodes is maintained to be constant, it is a structure that the short circuit between electrodes is not caused easily. Further, since concave portions of a transparent material having a saw-tooth-shaped cross-section or a saw-tooth-shaped cross-section approximated by steps, are filled with a liquid crystal, the thickness of the liquid crystal layer can be reduced. As a result, it is possible to achieve low-voltage operation and high-speed response. Here, the concave-convex portion preferably has a so-called Fresnel lens shape in which the height of each convex portions and the height of each concave portions with respect to the surface of the transparent substrates are uniform, namely, the depth of concave portions with respect to convex portions are uniform in the saw-tooth-shaped cross-section or the saw-tooth-shaped cross-section approximated by steps.

2. The liquid crystal lens element according to the above 1, wherein the liquid crystal has an ordinary refractive index $n_o$ and an extraordinary refractive index $n_e$ (here, $n_o \neq n_e$), the substantial refractive index of the liquid crystal layer changes within a range of from $n_o$ to $n_e$ according to the magnitude of the applied voltage, alignment direction of liquid crystal molecules at no voltage application is uniformly in a specific direction in the liquid crystal layer, and the transparent material of the concave-convex portion is a transparent material having a refractive index $n_s$ at least for extraordinarily polarized incident light, and the refractive index $n_s$ is a value between $n_o$ and $n_e$ (containing cases where the value $n_s$ equals to $n_o$ or $n_e$).

Here, the transparent material for the concave-convex portion, may be a birefringent material besides a uniform refractive index transparent material, so long as the material has a refractive index $n_s$ for extraordinarily polarized incident light.

According to this construction, a state that the refractive indexes of the liquid crystal and the transparent material of the concave-convex portion are different and a state that they are equal, are produced depending on the magnitude of applied voltage. Accordingly, a liquid crystal lens element is obtained, which can switch its function between a lens function of changing transmission wavefront of incident light to correct a spherical aberration containing a power component, and a function of not changing transmission wavefront of incident light. In particular, when the refractive index $n_s$ of the concave-convex portion is equalized to $n_e$, since no refractive index difference is generated between the concave-convex portion and the liquid crystal layer for extraordinarily polarized incident light when no voltage is applied, a function of not changing transmission wavefront of incident light, is developed. On the other hand, when the refractive index $n_s$ of the concave-convex portion is equalized to $n_o$, since no refractive index difference is generated between the concave-convex portion and the liquid crystal layer for ordinarily polarized incident light when no voltage is applied, a function of not changing transmission wavefront of incident light, is developed. Since there is no wavelength dependence of transmission wavefront change, a function of not changing transmission wavefront even if light of a plurality of wavelength bands for e.g. BD, DVD and CD.

3. The liquid crystal lens element according to the above 2, wherein the transparent material of the concave-convex portion has a refractive index $n_s$ satisfying the following formula:

$$|n_e - n_s| \leq |n_e - n_o|/2$$

and the concave-convex portion has concave portions having a depth d within the following formula at a wavelength $\lambda$ of light transmitted through the liquid crystal:

$$(m - 0.25) \cdot \lambda / |n_e - n_s| \leq d \leq (m + 0.25) \cdot \lambda / |n_e - n_s| \quad (2)$$

wherein m=1, 2 or 3.

Here, the transparent material of the concave-convex portion may be a birefringent material besides a uniform refractive index transparent material, so long as the material has a refractive index $n_s$ for extraordinarily polarized incident light. Namely, the present invention provides the liquid crystal element wherein the transparent material of the concave-convex portion has a refractive index $n_s$ satisfying the following formula:

$$|n_e - n_s| \leq |n_e - n_o|/2$$

and the concave-convex portion has a concave portion having a depth d within the range of Formula (2) at the wavelength $\lambda$.

According to this construction, provided that the difference between a substantial refractive index n(V) of the liquid crystal layer changing depending on the magnitude of applied voltage V for linearly polarized incident light having a polarization plane in the molecular alignment direction of the liquid crystal, and the refractive index $n_s$ of the transparent material of the concave-convex portion, is designated as $\Delta n(V) = n(V) - n_s$, then, the maximum optical path difference $\Delta n(V) \cdot d$ between the transparent material of convex portions and the liquid crystal of the concave portions, changes from about $+m\lambda$ to $-m\lambda$ depending on the magnitude of applied voltage. Here, at an applied voltage $V_0$ satisfying $\Delta n(V_0)=0$, namely, at an applied voltage $V_0$ at which the refractive index of the liquid crystal layer equals to the refractive index $n_s$ of the transparent material of the concave-convex portion, a function of not changing transmission wavefront of incident light, is developed.

Further, in the vicinity of $V_0$, a function of switching a power component generated to a transmission wavefront between positive (convex lens) and negative (concave lens), is developed. Accordingly, a liquid crystal lens element is obtained, which can switch a focal length, namely, a spherical aberration containing a power component according to applied voltage.

When m=1, at applied voltages $V_{+1}$ and $V_{-1}$ ($V_{+1}<V_0<V_{-1}$), $\Delta n(V) \cdot d = +\lambda$ and $-\lambda$ respectively, and when m=2, in addition to the case of m=1, at applied voltages $V_{+2}$, $V_{-2}$ ($V_{+2}<V_{+1}<V_0<V_{-1}<V_{-2}$), $\Delta n(V) \cdot d = +2\lambda$ and $-2\lambda$ respectively, and when m=3, in addition to the case of m=2, at applied voltages $V_{+3}$, $V_{-3}$ ($V_{+3}<V_{+2}<V_{+1}<V_0<V_{-1}<V_{-2}<V_{-3}$), $\Delta n(V) \cdot d = +3\lambda$ and $-3\lambda$ respectively.

Namely, a liquid crystal lens element is formed, which can switch a transmission wavefront, namely, a spherical aberration containing a power function according to a value of m and according to (2m+1) sorts of applied voltages. Here, a power-generating effect is developed also at an intermediate voltage value.

In order to make such functions effectively be developed when the depth d of concave portions of the concave-convex portion satisfies Formula (2), the resistivity $\rho_F$ of the concave-convex portion material is preferably sufficiently lower than the resistivity $\rho_{LC}$ of the liquid crystal layer. Specifically, $\rho_F/\rho_{LC}$ is preferably at most $10^{-5}$. As a result, in a voltage applied between the transparent electrodes, voltage drop in the concave-convex portion is reduced, and thus, the voltage is substantially applied to the liquid crystal layer.

On the other hand, when the resistivity $\rho_F$ of the concave-convex portion material is not sufficiently lower than the resistivity $\rho_{LC}$ of the liquid crystal layer, a voltage drop of the concave-convex portion occurs with respect to the applied voltage V between the transparent electrodes, and thus, a voltage $V_{LC}$ applied to the liquid crystal layer substantially drops.

In a case where the concave-convex portion material and the liquid crystal layer each has a resistivity large enough to be regarded as an insulator, an applied voltage V is distributed in accordance with the ratio between the electric capacitance $C_F$ of the concave-convex portion and the electric capacitance $C_{LC}$ of the liquid crystal layer, and a voltage $V_{LC}$ applied to the liquid crystal layer is determined. Namely, by adjusting the electric capacitances $C_F$ and $C_{LC}$ changing depending on the thickness ratio between the concave-convex portion having a saw-tooth-shaped cross-section or a cross-sectional shape of a saw-tooth shape approximated by steps, and the liquid crystal layer, that are present between the transparent electrodes, it is possible to adjust an average refractive index between the electrodes, namely, an optical path length according to the shape of the concave-convex portion. As a result, an applied voltage $V_0$ at which transmission wavefront of incident light is not changed, an applied voltage $V_{+1}$ at which power component of transmission wavefront becomes positive (convex lens), and an applied voltage $V_{-1}$ at which power component of transmission wavefront becomes negative (concave lens), are present. Accordingly, a liquid crystal lens element is obtained, which can switch focal length, namely, spherical aberration containing a power component.

4. The liquid crystal lens element according to any one of the above 1 to 3, which further comprises a phase plate having a phase difference of an odd number times of n/2 for the light of wavelengths $\lambda$, integrated into the liquid crystal lens element.

5. A liquid crystal lens element comprising the liquid crystal lens element as defined in the above 1, and a phase plate laminated on the liquid crystal lens element.

According to this construction, it is possible to change polarization state as well as a wavefront of transmission light by employing a single liquid crystal lens element which can be small sized.

6. A liquid crystal lens element comprising two liquid crystal lens elements as defined in the above 1 laminated together.

According to this construction, the effect of the liquid crystal lens element becomes a sum of effects of these two liquid crystal lenses. Further, when alignment directions of the liquid crystal molecules constituting these liquid crystal lens elements, are perpendicular to each other, the combined liquid crystal element functions as a liquid crystal lens which has a lens function regardless of polarization state, and when the alignment direction of the liquid crystal molecules are parallel with each other and the cross-sectional shapes (orbicular shapes) of the concave-convex portions are different, the combined liquid crystal element functions as a liquid crystal lens having a different power.

7. A liquid crystal lens element comprising the liquid crystal lens element as defined in the above 1, a polarizing diffraction element and a phase plate laminated together in this order.

According to this construction, it is possible to change polarization state besides a wavefront of transmission light by employing a singe liquid crystal lens which can be small sized, and it is possible to generate diffraction light depending on polarization.

8. An optical head device comprising a light source emitting light of wavelength $\lambda$, an objecting lens for converging light emitted from the light source on an optical recording medium, a beam splitter for separating light converged by the objective lens and reflected by the optical recording medium, and a photodetector for detecting the separated light, wherein the liquid crystal lens element as defined in any one of the above 1 to 4, is disposed in an optical path between the light source and the objective lens, is provided.

Further, by constructing an optical head device employing any one of the above liquid crystal lens elements, it is possible to correct a spherical aberration containing a power component caused by a difference of cover thickness between a single layer optical disk and double layer optical disk, and it is possible to obtain a stable aberration correction effect even with a relationship that the center position of the liquid crystal lens element is not completely aligned to that of an object lens, and accordingly, convergence to an information recording plane is improved, and an optical head device capable of stably writing and/or reading, is realized.

9. An optical head device comprising a light source for emitting light of a wavelength $\lambda_1$ and a wavelength $\lambda_2$ (here, $\lambda_1 \neq \lambda_2$), an objective lens for converging the light emitted from the light source on an optical recording medium, a photodetector for detecting the light converged by the objective lens and reflected by the optical recording medium, wherein the liquid crystal lens element as defined in any one of the above 1 to 4 is disposed in an optical path between the light source and the objective lens, and which uses linearly polarize light beams having polarization planes perpendicular to each other as the light of the wavelength $\lambda_1$ and the wavelength $\lambda_2$ incident into the liquid crystal lens element.

10. The optical head device according to the above 8 or 9, wherein the optical recording medium has a cover layer covering an information recording layer, and the optical head device carries out writing and/or reading of the optical recording media having the covering layers of different thicknesses from each other.

By constructing an optical head device employing any one of the above liquid crystal lens elements, it is possible to provide a function of correcting a spherical aberration caused by a difference of cover thickness in an optical disk, for incident light of wavelength $\lambda_1$ in accordance with the magnitude of applied voltage. On the other hand, for incident light of wavelength $\lambda_2$, it is possible to provide a function of not changing transmission wavefront of incident light regardless of the magnitude of applied voltage. As a result, even in a case of light of wavelength $\lambda_1$ and wavelength $\lambda_2$ is incident into a liquid crystal lens element, writing and/or reading of an optical disk using light of wavelength $\lambda_2$, is not adversely affected.

EFFECTS OF THE INVENTION

According to the present invention, electric field applied to the liquid crystal layer is highly uniform, and thus, a stable operation is obtained in a plane of liquid crystal lens element, and since the distance between transparent electrodes are maintained to be constant, short circuit between the transparent electrodes unlikely occurs. Further, since concave portions of a transparent material having a saw-tooth-shaped cross-section or a cross-section of a saw-tooth shape approximated by steps, are filled with a liquid crystal, the thickness of liquid crystal layer is reduced, which leads to low voltage driving and high speed response. In other words, it is possible to provide a liquid crystal lens element, having a lens function, which has no moving part and capable of being small sized, and which can stably correct a spherical aberration containing a power component, in accordance with applied voltage.

Further, by adding this liquid crystal lens element, it is possible to provide an optical head device which can correct a spherical aberration caused by a difference of cover thicknesses between a single layer optical disk and a double layer optical disk, and which can stably read and/or write even in a case where center positions of the liquid crystal lens element are not completely aligned to that of the objective lens.

BRIEF DESCRIPTION OF THE DRAWINGS

FIG. 3: A graph showing the optical path difference of a transmission wavefront generated by the liquid crystal lens, wherein α is a curve showing the optical path difference by a unit of wavelength λ at a radial position r shown in a horizontal axis. β is a curve showing an optical path difference of at least 0 and at most λ obtained by subtracting an integer times of wavelength λ from α. γ is a curve showing an optical path difference symmetrical to β about a plane of 0 optical path difference.

FIG. 4: A side view showing an effect of switching applied voltage to the liquid crystal lens element of the present invention, wherein FIG. 4(A) shows a converging transmission wavefront at an applied voltage $V_{+1}$. FIG. 4(B) shows a transmission wavefront having no wavefront change at an applied voltage $V_0$. FIG. 4(C) shows a diverging transmission wavefront at an applied voltage $V_{-1}$.

Figure 1:
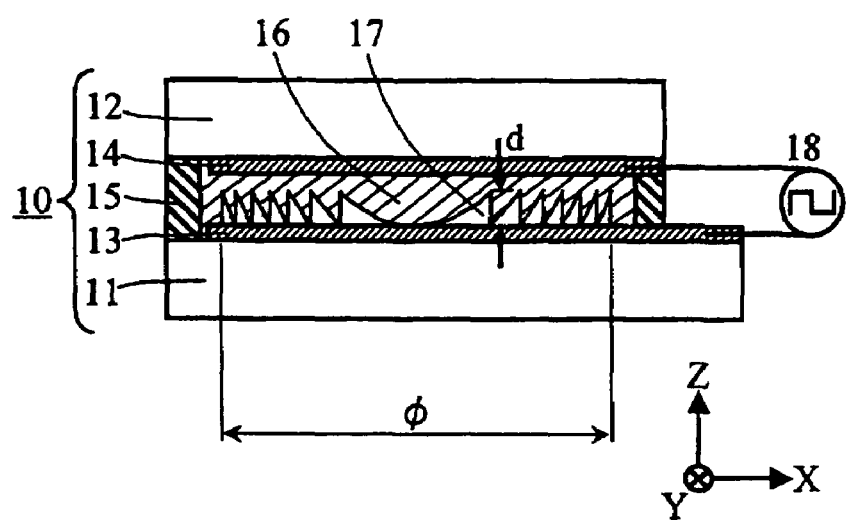
FIG. 1: A cross-sectional side view showing the construction of a liquid crystal lens element of a first embodiment according to the present invention.

EXPLANATION OF NUMERALS 1A, 1B, 61: laser diode (light source)
1C: double wavelength light source
2A, 2B, 2C, 53: diffraction grating
2C: diffraction grating having wavelength selectivity
3: dichroic prism
4: beam splitter
4B: hologram beam splitter
5: collimator lens
6: objective lens
7: cylindrical lens
8, 8A, 8B, 62: photodetector
10, 10A, 10B, 10C, 20, 30, 40, 50: liquid crystal lens element
11, 12, 12A, 12B, 21: transparent substrate
13, 13A, 13B, 14, 14A, 14B: transparent electrode
15, 15A, 15B: seal
16, 16A, 16B, 16C: liquid crystal
17, 17A, 17B, 17C: concave-convex portion
18, 18A, 18B: AC power source
22: phase plate
51: birefringent diffraction grating
52: adhesive agent layer
60: optical unit
63: metal block
64: package
70, 80, 90: optical head device
D: optical disk

BEST MODE FOR CARRYING OUT THE INVENTION

From now, embodiments of the present invention are described with reference to attached drawings.

First Embodiment

An example of the construction of a liquid crystal lens element 10 according to a first embodiment of the present invention, is described in detail with reference to a cross-sectional view shown in FIG. 1 and a plan view shown in FIG. 2.

The liquid crystal lens element 10 according to this embodiment comprises transparent substrates 11 and 12, transparent electrodes 13 and 14, a seal 15, a liquid crystal (liquid crystal layer) 16, a concave-convex portion 17 and an AC power source 18.

Among these, the concave-convex portion 17 is, for example, made of a uniform-refractive-index transparent material having a refractive index $n_s$ in this embodiment, and the concave-convex portion 17 has a cross-section of a saw-tooth shape or a saw-tooth shape approximated by steps, and has a rotational symmetry about an optical axis (Z axis) of incident light in a region of effective diameter ϕ. Here, the concave-convex portion 17 preferably has a Fresnel lens shape having the depth of concave portions with respect to convex portions, are uniform.

Then, an example of the process of producing the liquid crystal lens element 10, is described as follows.

First of all, a transparent electrode 13 is formed on one flat surface of a transparent substrate 11. Further, on one flat surface (upper surface in FIG. 1) of the transparent electrode 13, a concave-convex portion 17 made of a uniform-refractive-index transparent material having a refractive index $n_s$ and having a tooth-shape cross-section or a saw-tooth shape approximated by depth, is formed.

Further, on a transparent substrate 12 on which a transparent electrode 14 is formed, an adhesive agent, not shown, in which a gap control material is mixed, is printed to be patterned to form a seal 15, and they are laminated with the transparent substrate 11 and bonded by pressing to produce an empty cell. From an injection port (not shown) provided at a part of the seal 15, a liquid crystal 16 having an ordinary refractive index $n_o$ and an extraordinary refractive index $n_e$ (here, $n_o \neq n_e$) is injected, and the injection port is sealed to seal the liquid crystal 16 in the cell to form a liquid crystal lens element 10 of this embodiment.

Thus by filling at least concave portions of the concave-convex portion 17 with the liquid crystal 16 and applying an AC voltage of rectangular wave to the transparent electrodes 13 and 14 by using an AC power source 18, molecular alignment of the liquid crystal 16 changes and substantial refractive index of the liquid crystal (layer) 16 changes from $n_e$ to $n_o$. As a result, a refractive index difference $\Delta n(V)$ between the liquid crystal 16 and the concave-convex portion 17 changes according to the magnitude of applied voltage, and a wavefront of transmission light changes with respect to that of incident light.

Here, the concave-convex portion 17 made of an uniform-refractive-index transparent material, may be made of an organic material such as a UV-curable resin, a thermosetting resin or a photo-sensitive resin, or an inorganic material such as $SiO_2$, $Al_2O_3$ or $SiO_xN_y$ (here, x and y show the element proportion of O and N). Namely, the uniform-refractive-index transparent material has only to be transparent material having a refractive index $n_s$ that is a refractive index between $n_o$ and $n_e$ including $n_o$ and $n_e$.

The concave-convex portion 17 may be formed by forming on a surface of the transparent electrode 13, an uniform-refractive-index transparent material layer having a predetermined film thickness, and fabricating the layer into a concave-convex shape by photolithography or reactive ion etching, or by transferring the shape of concave-convex shape to the uniform-refractive-index transparent material layer by using a mold.

Further, in order to obtain a large change of refractive index difference $\Delta n(V)$ with respect to applied voltage, alignment direction of liquid crystal molecules in the liquid crystal 16 filling the concave portions, is preferably uniformly in a direction of polarization plane of light incident into the liquid crystal lens element 10. For example, in FIG. 2, alignment direction of liquid crystal molecules (namely, a direction of extraordinary refractive index $n_e$) is uniformly aligned in X-axis direction, and linearly polarized light having a polarization plane in X-axis direction, is incident into the liquid crystal.

It is possible to uniformly align the alignment direction of the liquid crystal molecules in X-axis direction, by applying an alignment compound (not shown) such as polyimide on surfaces of the transparent electrode 14 and the concave-convex portion 17, and curing the alignment compound and subjecting it to a rubbing treatment in x-axis direction. Uniform alignment is also possible by using polyimide for the material of the concave-convex portion 17 and subjecting its surface to a rubbing treatment. Besides the rubbing treatment of polyimide, liquid crystal molecules may be aligned by using a SiO oblique deposition film or an optical alignment film.

Here, in order to apply a voltage to the transparent electrode 14 via an electrode 141 formed on the transparent substrate 11 side, conductive metal particles are mixed in the seal 15 in advance and seal-press-bonded, to develop conductivity in the thickness direction of the seal to electrically conduct between the transparent electrode 14 and the electrode 141. By connecting an AC power source to an electrode 131 connected with the transparent electrode 13 and to the electrode 141 connected with the transparent electrode 14, a voltage can be applied to the liquid crystal 12.

Then, cross-sectional shape of the concave-convex portion having a saw-tooth shape or a saw-tooth shape approximated by steps, is described as follows. In order to generate a transmission wavefront for correcting a spherical aberration caused by a difference of cover thickness of optical disks, by using the liquid crystal lens 10 of the present invention, and in order to form a transmission wavefront to which a positive or a negative power component is added, the liquid crystal lens 10 is configured so that an optical path difference OPD of a light beam passing through a point distant by a radius r from a light beam passing through an optical axis center (origin of coordinates: $x=y=0$) in a transmission wavefront of a plane wave incident into the liquid crystal lens 10, is represented by the following power series:

$$OPD(r) = a_1 r^2 + a_2 r^4 + a_3 r^6 + a_4 r^8 + \tag{3}$$

wherein $r^2 = x^2 + y^2$ $a_1, a_2, \ldots$ : constant (refer to Table 1 to be described later)

Here, a specific example of a curve of an optical path difference OPD shown by a wavelength unit $\lambda$ in relation to a radius r shown in a horizontal axis, is shown with a symbol $\alpha$ in FIG. 3.

In a case of incident coherent light of wavelength $\lambda$ with uniform phase, transmission wavefronts having an optical path difference of an integer times of $\lambda$, may be regarded as equivalent to each other. Accordingly, a graph $\beta$ showing an optical path difference obtained by slicing the graph (optical path difference) shown by $\alpha$ of FIG. 3 at a wavelength $\lambda$ interval and projecting it into a plane of optical path difference 0, is substantially equivalent to the graph $\alpha$. Optical path length difference shown in graph $\beta$, is all within $\lambda$, and its cross-section has a saw-tooth shape.

Here, in a case where the electric volume resistivity $\rho_F$ of the transparent material of the concave-convex portion 17 is sufficiently lower than the electric volume resistivity $\rho_{LC}$ of the liquid crystal 16, specifically, in a case where $\rho_F / \rho_{LC}$ is at most $10^{-5}$, a voltage applied between the transparent electrodes 13 and 14 is substantially applied to the liquid crystal 16.

Under such a condition for substantially equalizing the applied voltage between the transparent electrodes and the applied voltage to the liquid crystal 16 (this is referred to as "Case 1"), cross-sectional shape of the concave-convex portion 17 and functions of the liquid crystal lens element 10 are described as follows.

When a voltage V is applied to the transparent electrodes 13 and 14, provided that a substantial refractive index of the liquid crystal (layer) 16 for extraordinarily polarized light is designated as $n(V)$, the refractive index difference between the concave-convex portion 17 made of an uniform-refractive-index transparent material and the liquid crystal 16, is $\Delta n(V)=n(V)-n_s$.

Figure 2:
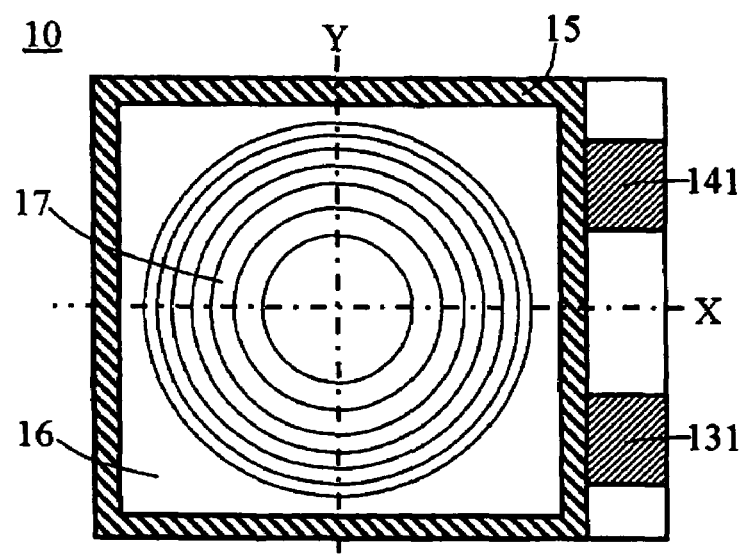
FIG. 2: A plan view showing the construction of the liquid crystal lens element shown in FIG. 1.

For example, it is possible to produce an optical path difference of a transmission wavefront corresponding to the graph β of FIG. 3 at an applied voltage $V_{+1}$, by fabricating a concave-convex portion 11 shown in FIG. 1 to have a depth d satisfying the following formula:

$$d=\lambda/\Delta n(V_{+1}) \quad (4)$$

wherein λ: wavelength of incident light $\Delta n(V_{+1})$: refractive index difference at an applied voltage $V_{+1}$ (between the concave-convex portion 17 and the liquid crystal 16)

Here, the applied voltage $V_{+1}$ satisfies $\Delta n(V_{+1})>0$.

Here, the refractive index difference Δn is changed by changing the applied voltage V. For example:

i) at an applied voltage $V_0$ satisfying $\Delta n(V_0)=0$, transmission wavefront through the liquid crystal lens element 10 is not changed; further ii) at an applied voltage $V_{-1}$ satisfying $\Delta n(V_{-1})=-\Delta(V_{+1})$, a transmission wavefront having an optical path difference shown by graph γ in FIG. 3, is generated. This corresponds to a transmission wavefront having an optical path difference symmetric about a plane of optical path difference 0 with graph β of FIG. 3.

By the way, the refractive index difference $n_s$ of the uniform-refractive-index transparent material forming the concave-convex portion 17 is a refractive index value present between $n_o$ and $n_e$ including $n_o$ and $n_e$ (including cases where the refractive index $n_s$ value equals to $n_o$ or $n_e$), and accordingly, voltage values $V_o$ and $V_{+1}$ or $V_{-1}$ are present. Accordingly, the concave-convex portion 17 made of the uniform-refractive-index transparent material, is fabricated to have a cross-section of saw-tooth shape or a saw-tooth shape approximated by steps so as to form an optical path difference spatial distribution corresponding to graph β and graph γ of FIG. 3 when the refractive indexes of the liquid crystal 16 are $n(V_{+1})$ and $n(V_{-1})$.

In the liquid crystal lens element 10 of this embodiment, when the refractive index $n_s$ of the uniform-refractive-index transparent material forming the concave-convex portion 17, is made to satisfy the following formula:

$$|n_e-n_s| \leq |n_e-n_o|/2$$

then voltage values satisfying $V_{+1}<V_0<V_{-1}$ satisfying the following formula, are always present:

$$\Delta n(V_0)=0 \text{ and}$$

$$\Delta n(V_{+1})=-\Delta n(V_{-1})>0$$

Accordingly, by switching applied voltages $V_{+1}$, $V_0$ and $V_{-1}$ by the AC power source 18, it becomes possible to selectively switch a transmission wavefront among three types of transmission wavefronts. Further, if the following formula is satisfied, the refractive index $n_s$ of the uniform-refractive-index transparent material approximately equals to $(n_o+n_e)/2$:

$$|n_s-[(n_o+n_e)/2]| \leq (n_e-n_o)/4$$

Further, the refractive index of the liquid crystal 16 with no voltage application is $n_e$, and in order to produce an optical path difference corresponding to graph β and graph γ of FIG. 3 at application voltage values $V_{+1}$ and $V_{-1}$, the depth d of the concave-convex portion 17 is preferably within the following range:

$$0.75 \cdot [\lambda/|n_e-n_s|] \leq d \leq 1.25 \cdot [\lambda/|n_e-n_s|]$$

This corresponds to a case of m=1 in Formula (2).

Here, plane waves incident into the liquid crystal lens 10 at applied voltages $V_{+1}$, $V_0$ and $V_{-1}$ (here, $V_{+1}<V_0<V_{-1}$), are converted into transmission wavefronts shown in FIG. 4(A), FIG. 4(B) and FIG. 4(C) to be output. Namely, lens functions corresponding to positive power, no power and negative power, are obtained according to the applied voltage to the transparent electrodes 13 and 14.

Here, at an intermediate applied voltage V between voltages $V_{+1}$ and $V_0$ or between voltages $V_0$ and $V_{-1}$, two types of wavefronts (wavefronts shown in FIG. 4(A) and FIG. 4(B) or wavefronts FIG. 4(B) and FIG. 4(C)) are mainly generated at a proportion according to the voltage V.

In this embodiment under the condition of the Case 1, explanation has been made to the embodiment of liquid crystal lens element generating β being an optical path difference OPD obtained by slicing the optical path difference OPD shown by α of FIG. 3 at a wavelength λ interval (that corresponds to m=1 in Formula (2)), but it may be an embodiment of a liquid crystal lens element corresponding to m=2 or 3. In this case, a transmission wavefront corresponding to an optical path difference OPD obtained by slicing α of FIG. 3 at a wavefront m·λ (here, m=2 or 3) interval.

When the electric volume resistivity $\rho_F$ of the transparent material of the concave-convex portion 17, is not sufficiently lower than the electric volume resistivity $\rho_{LC}$ of the liquid crystal 16, the voltage applied between the transparent electrodes 13 and 14 is distributed into the concave-convex portion 17 and the liquid crystal (layer) 16 according to an electric capacitance $C_F$ dependent on the relative dielectric constant $\epsilon_F$ and the film thickness $d_F$ of the transparent material of the concave-convex portion 17, and an electric capacitance $C_{LC}$ dependent on the relative dielectric constant $\epsilon_{LC}$ and the film thickness $d_{LC}$ of the liquid crystal 16.

Namely, in an electric equivalent circuit containing electric resistances $R_F$ and $R_{LC}$ and electric capacitances $C_F$ and $C_{LC}$ of the concave-convex portion 17 and the liquid crystal (layer) 16 respectively, it is possible to calculate an applied voltage $V_{LC}$ to the liquid crystal (layer) 16 in response to an AC applied voltage V of AC frequency f between the transparent electrodes.

On the other hand, when the electric volume resistivities $\rho_F$ and $\rho_{LC}$ of the concave-convex portion 17 and the liquid crystal 16 respectively, are sufficiently large, and the voltage distribution to the concave-convex portion 17 and the liquid crystal (layer) 16 is determined by the electric capacitances $C_F$ and $C_{LC}$ of the concave-convex portion 17 and the liquid crystal (layer) 16 respectively in the electric equivalent circuit, namely, under the condition that $f \times R_F \times C_F$ and $f \times R_{LC} \times C_{LC}$ are sufficiently smaller than 1 (this is referred to as "Case 2"), cross-sectional shape of the concave-convex portion 17 and functions of the liquid crystal lens element 10 are described as follows.

Figure 5:
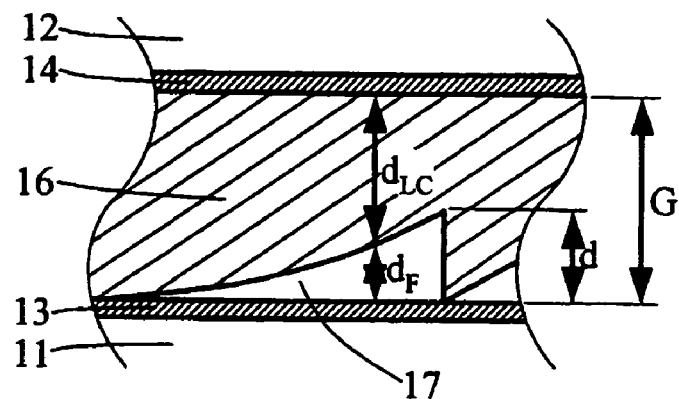
FIG. 5: An enlarged cross-sectional view between transparent electrodes in a side view of a liquid crystal lens element of the present invention.

In FIG. 1 showing the cross-sectional view of the liquid crystal lens element 10, an enlarged view showing the concave-convex portion 17 and the liquid crystal 16 between the transparent electrodes 13 and 14, is shown in FIG. 5. In FIG. 5, the distance between the transparent electrodes 13 and 14 is a constant value G. Further, the film thickness $d_F$ of the concave-convex portion 17 is distributed from 0 to d, and the film thickness $d_{LC}$ of the liquid crystal 16 is distributed from G to G−d. Here, a value $d_F+d_{LC}(=G)$ is a constant value.

In Case 2, a ratio $V_{LC}/V$ of an applied voltage $V_{LC}$ is distributed to the liquid crystal (layer) 16 based on the AC applied voltage V between the transparent electrodes 13 and 14, is represented by the following formula:

$$V_{LC}/V = C_F/(C_F + C_{LC}) \quad (5)$$
$$= 1/\{1 + (\varepsilon_{LC}/\varepsilon_F) \times (d_F/d_{LC})\}$$

wherein $\epsilon_{LC}$: relative dielectric constant of liquid crystal 16

$\epsilon_F$: relative dielectric constant of concave-convex portion 17

Here, the film thickness $d_F$ of the concave-convex portion 17 is distributed from 0 to d according to the cross-sectional shape of a saw-tooth shape or a saw-tooth shape approximated by steps, consisting a Fresnel lens, and thus, $d_F/d_{LC}$ is distributed from 0 to d/(G−d). As a result, the applied voltage $V_{LC}$ to the liquid crystal (layer) 16 is spatially distributed according to the shape of the concave-convex portion 17.

In order to efficiently apply a voltage to the liquid crystal (layer) 16, the material of the concave-convex portion 17 is preferably a material having a large relative dielectric constant $\epsilon_F$ so as to increase the ratio $V_{LC}/V$ of Formula (5). Since the relative dielectric constant $\epsilon_{LC}$ of the liquid crystal (layer) 16, is at least about 4, the relative dielectric constant $\epsilon_F$ is preferably at least 4.

Further, in general, since a liquid crystal has a dielectric anisotropy wherein the specific electric constant $\epsilon_{//}$ in a liquid crystal molecular long axis direction and a relative dielectric constant $\epsilon_\perp$ in a liquid crystal molecular short axis direction, are different from each other, alignment of liquid crystal molecules is changed according to voltage application, and by the change of alignment of the liquid crystal molecules, the relative dielectric constant $\epsilon_{LC}$ of the liquid crystal (layer) 16 is also changed. Accordingly, in Formula (5), a spatial distribution of the applied voltage $V_{LC}$ to the liquid crystal (layer) 16 is determined according to the shape of the concave-convex portion 17 and influenced by the change of the relative dielectric constant $\epsilon_{LC}$ according to $V_{LC}$. Since $V_{LC}$ changes depending on $d_F$, it is shown as $V_{LC}[d_F]$ from now on. Here, $V_{LC}[0]$ equals to an applied voltage V between the electrodes.

In Case 2, differently from Case 1, since the voltage $V_{LC}$ applied to the liquid crystal (layer) 16 changes depending on the shape of the concave-convex portion 17, substantial refractive index $n(V_{LC}[d_F])$ of the liquid crystal (layer) 16 for extraordinarily polarized incident light, is spatially distributed. In FIG. 5, an optical path between the transparent electrodes 13 and 14 at a position where the film thickness of the concave-convex portion 17 is $d_F$, is $n_s \times d_F + n(V_{LC}[d_F]) \times d_{LC}$, and an optical path difference OPD with respect to an optical path $n(V) \times G$ at a Fresnel lens center ($d_F=0$) where the concave-convex portion 17 is not formed, is represented by the following formula:

$$OPD = \{n_s \times d_F + n(V_{LC}[d_F]) \times (G-d_F)\} - n(V) \times G \quad (6)$$

The film thickness $d_F$ is distributed from 0 to d, and the optical path difference OPD is distributed from 0 to $OPD_d$ represented by the following formula.

$$OPD_d = \{n_s \times d + n(V_{LC}[d]) \times (G-d)\} - n(V) \times G$$
$$= \{n(V_{LC}[d]) - n(V)\} \times G - \{n(V_{LC}[d]) - n_s\} \times d$$

For example, it is possible to produce an optical path difference of a transmission wavefront corresponding to graph β of FIG. 3 at an applied voltage $V_{+1}$, by determining the film thickness d of the concave-convex portion 17 and the distance G between the transparent electrodes 13 and 14 so that the optical path difference $OPD_d$ becomes substantially λ (namely, from 0.75 λ to 1.25 λ), and making the concave-convex portion 17 have a cross-sectional shape in which the film thickness of the concave-convex portion 17 is distributed from 0 to d.

Here, by changing the applied voltage V, the optical path difference OPD of Formula (6) is changed.

For example, i) when the film thickness $d_F$ of the concave-convex portion 17 is distributed from 0 to d, an applied voltage $V_0$ making the optical path difference OPD of Formula (6) a sufficiently small value with respect to a wavelength λ of incident light, is present. At this time, a transmission wavelength through the liquid crystal lens element 10 is not changed. Here, the sufficiently small optical path difference OPD, is specifically at most λ/5, more preferably at most λ/10. Further, ii) at an applied voltage $V_{-1}$ making the optical path difference $OPD_d$ approximately −λ (namely from −0.75 λ to −1.25 λ), a transmission wavefront having an optical path difference shown by graph y in FIG. 3, is generated. This corresponds to a transmission wavefront having an optical path difference symmetric about a plane of optical path difference 0 with graph β of FIG. 3.

Accordingly, by switching an applied voltage among $V_{+1}$, $V_0$ and $V_{-1}$ by an AC power source 18, it is possible to selectively switch a transmission wavefront among three types of transmission wavefronts.

Here, plane waves incident into the liquid crystal 10 at applied voltages $V_{+1}$, $V_0$ and $V_{-1}$, are transformed into transmission wavefronts shown in FIG. 4(A), FIG. 4(B) and FIG. 4(C) respectively, to be output. Namely, lens functions corresponding to positive power, no power and negative power, are obtained according to applied voltage between the transparent electrodes 13 and 14. In the same manner as in the case under the condition of Case 1, besides the liquid crystal lens element generating graph β being an optical path difference OPD obtained by slicing the optical path difference OPD shown as α of FIG. 3 at a wavelength λ interval, an embodiment of liquid crystal lens element producing an optical path difference $OPD_d$ corresponding to about mλ (m=2 or 3), is also usable. In this case, transmission wavefront corresponds to an optical path difference OPD obtained by slicing graph α of FIG. 3 at a wavefront m·λ (here, m=2 or 3) interval, is produced.

Here, differently from Case 1, in a case of producing three types of transmission wavefronts, the refractive index $n_s$ of the uniform-refractive-index transparent material of the concave-convex portion 17 may be approximately equal to the ordinary refractive index $n_o$ or the extraordinary refractive index $n_e$ of the liquid crystal 16.

For example, in a case where a liquid crystal having a $n_o$ satisfying $n_s=n_o$ and having a positive dielectric anisotropy ($\Delta\epsilon=\epsilon_{//}-\epsilon_\perp$), is subjected to a homogeneous alignment, if the concave-convex portion 17 is formed so that the optical path difference $OPD_d = -(n_e - n_o) \times d$ becomes $-\lambda$ at no applied voltage ($V_{+1}=0$), a plane wave of extraordinarily polarized light incident into the liquid crystal lens 10 in both Case 1 and Case 2, is transformed into a transmission wavefront corresponding to a positive power shown in FIG. 4(A), to be output. When the applied voltage between the transparent electrodes 13 and 14, is increased, in Case 1, the refractive index of the liquid crystal (layer) 16 becomes close to $n_s$ at a high applied voltage of at least 10 V, and a transmission wavefront corresponding to no power shown in FIG. 4(B) is obtained, but a transmission wavefront corresponding to negative power shown in FIG. 4(C) is not generated. However, in Case 2, at an applied voltage of at most 5 V, a transmission wavefront corresponding to no power shown FIG. 4(B) or a transmission wavefront corresponding to negative power shown in FIG. 4(C) can be produced.

Namely, in Case 2, as compared with Case 1, design of electrooptical characteristics of the liquid crystal lens element 10 is more flexible by selectivity of refractive indexes and relative dielectric constants of the liquid crystal 16 and the concave-convex portion 17, a film thickness d of the concave-convex portion, a distance G between the transparent electrodes 13 and 14, and the like, and accordingly, low-voltage operation or producing various types of transmission wavefronts are possible. Further, as compared with Case 1, in Case 2, since the film thickness d of the concave-convex portion 17 can be reduced, film deposition and concave-convex fabrication processes can be curtailed.

Further, the refractive index $n_s$ of the concave-convex portion 17 is preferably made substantially equal to the ordinary refractive index $n_o$ of the liquid crystal (layer) 16. In this case, there is a merit that since no refractive index difference is generated between the concave-convex portion 17 and the liquid crystal (layer) 16 for ordinarily polarized light regardless of applied voltage between electrodes, transmission wavefront of ordinarily polarized light incident into the liquid crystal lens element 10, is not changed and thus, high transmittance is obtained. Namely, in a case where a plurality of light fluxes are incident into the liquid crystal lens element 10 and it is desired to transmit a specific light flux without generating wavefront change, it is sufficient that the light flux is incident into the liquid crystal lens element 10 as ordinarily polarized light. For example, in order to make the liquid crystal lens element 10 develop a power-switching function only for light of wavelength for DVD when light fluxes of different wavelengths for DVD and for CD are incident into the element, it is sufficient that the light for DVD is extraordinarily polarized light, the light for CD is ordinarily polarized light and they are incident into the liquid crystal lens element 10.

Further, in this embodiment, element structure and operation principle are described with respect to a liquid crystal lens element 10 using the optical path difference OPD of rotational symmetry represented by Formula (3). But a liquid crystal lens element producing an optical path difference OPD corresponding to correction of aberrations other than that of Formula (3) such as a coma aberration having a rotational asymmetry or an astigmatism, also can be produced by fabricating an uniform-refractive-index transparent materials into concave-convex shape and filling concave portions with a liquid crystal by the same principle.

Further, in this embodiment, the depth d of the concave-convex portion 17 is set so that the absolute value of an optical path difference OPD generated by the liquid crystal lens element 10 becomes at most a wavelength $\lambda$ of incident light, and the cross-sectional shape of the concave-convex portion 17 is made to be a saw-tooth shape. However, in a case where high-speed response is not necessary, the concave-convex portion 17 may be fabricated so that the absolute value of the optical path difference OPD becomes more than wavelength $\lambda$ of the incident light.

In this case, since the distance between electrodes is more uniform as compared with the liquid crystal lens described in Patent Document 2 in the section of Prior Art, uniformity of electric field applied to the liquid crystal becomes more excellent and driving voltage and response speed become more uniform in an element plane. In the same manner, differently from the liquid crystal diffraction lens described in Patent Document 3 in the section of Prior Art, optical path difference is continuously changed according to the magnitude of applied voltage.

Further, in a case where the absolute value of an optical path difference OPD to be corrected is at most a wavelength $\lambda$ of incident light, it is not necessary to make the cross-sectional shape of the concave-convex portion 17 of the liquid crystal lens element 10 made of, a uniform-refractive-index transparent material, to a saw-tooth shape, and the optical path difference is continuously changed according to the magnitude of applied voltage.

Further, in this embodiment, an example is shown, which employs a liquid crystal 16 having a positive dielectric anisotropy whereby the liquid crystal is aligned in parallel with surfaces of the substrates 11 and 12 at no applied voltage, and the liquid crystal molecules are aligned vertically to the surfaces of the substrates 11 and 12 according to the magnitude of applied voltage. But different liquid crystal alignment or liquid crystal material, may also be employed. For example, a liquid crystal may be employed, which has a negative dielectric anisotropy whereby the liquid crystal molecules are aligned vertically to the substrate surfaces at no voltage application, and the liquid crystal molecules are aligned in parallel to the substrate surfaces according to an applied voltage V.

Further, in this embodiment, the material forming the concave-convex portion 17 is a uniform-refractive-index transparent material of refractive index $n_s$. However, a birefringent material such as a polymer liquid crystal having a molecular alignment direction uniform in a substrate plane, may also be employed. In this case, it is preferred to make an extraordinary refractive index of the birefringent material $n_s$, and equalize an ordinary refractive index of the birefringent material to the ordinary refractive index $n_o$ of the liquid crystal, and make molecular alignment direction (the direction of the extraordinary refractive index) of the birefringent material coincide with the alignment direction of liquid crystal molecules. By such a construction, the ordinary refractive indexes of the liquid crystal and the birefringent material become equal to each other for ordinarily polarized incident light regardless of the magnitude of applied voltage, and thus, transmission wavefront does not change.

Further, in this embodiment, an element was shown, which has a construction that AC voltage is applied to the liquid crystal 16 via a transparent electrode 13 and a transparent electrode 14 each being one piece electrode provided over an entire surface of the transparent substrates 11 and 12 respectively. In the present invention, besides this construction, the construction may be such that at least one electrode selected from the transparent electrode 13 and the transparent electrode 14, is specially divided into segments to which different AC voltages can be applied independently. Accordingly, spatial distributions having further various optical path differences OPD, can be produced.

Further, such spatially divided transparent electrodes may be resister films having a desired electric resistance, and an applied voltage distribution may be formed in the radius direction so that voltage applied to the liquid crystal has a slope distribution in the radius direction.

Second Embodiment

Then, a liquid crystal lens element 20 according to the second embodiment of the present invention, is described with reference to FIG. 6. Here, in this embodiment, the same components as those of the first embodiment, are designated as the same reference numerals to avoid duplication of explanation.

The liquid crystal lens element 20 of this embodiment has a construction that in the liquid crystal lens element 10 according to the first embodiment, a phase plate 22 and a transparent substrate 21 are further added. Namely, in the liquid crystal lens element 20, a phase plate 22 made of a birefringent material is sandwiched between a surface of the transparent substrate 12 opposite from a surface on which the transparent electrode 14 is formed, and a transparent substrate 21, to be integrated.

As the phase plate 22, a birefringent material film produced by drawing an organic film such as a polycarbonate and thus having a slow phase axis in the drawing direction, is employed and adhered between the transparent substrates 12 and 21 by an adhesive agent. Or else, the phase plate may be formed by applying a liquid crystal monomer on a transparent substrate 21 subjected to an alignment treatment, to have a predetermined film thickness, and then, polymerizing and curing the liquid crystal monomer to form a polymer liquid crystal film to be used as the phase plate. Or else, a birefringent crystal such as quartz may be employed as a phase plate 22 and adhered and fixed to the transparent substrate 12 instead of the transparent substrate 21.

In any of these cases, the optical axis direction of the phase plate 22 is set to be a direction at an angle of 45° to X axis direction being the direction of polarization plane of incident light, in XY plane. For example, the retardation value of the phase plate 22 for incident light of wavelength λ, is set to be an odd number times of ¼ of wavelength λ, namely, so as to produce a wavelength difference of an odd number times of n/2, light transmitted through the liquid crystal lens element 20 becomes circularly polarized light to be output.

Accordingly, by employing the liquid crystal lens element 20 of this embodiment in an optical head device, it is possible to change a wavefront and polarization state of transmission light by a single element.

Third Embodiment

Then, a liquid crystal lens element 30 according to a third embodiment of the present invention, is described with reference to FIG. 7. Here, in this embodiment, components in common with those of the first embodiment are designated as the same reference numerals to avoid duplication of explanations.

The liquid crystal lens element 30 of this example has a construction that two liquid crystal lens elements 10 according to the first embodiment, are laminated in a vertical direction so that their concave-convex portions 17 are opposed to each other (here, they share the transparent substrate 11), and comprises as main components a first liquid crystal lens element 10A, a second lens element 10B and an AC power source 18 for applying AC voltage to these elements.

Namely, the liquid crystal lens element 30 comprises in the first liquid crystal lens element 10A, two transparent substrates 11 and 12A, transparent electrodes 13A and 14A formed on these transparent substrates, a concave-convex portion 17A formed on the transparent electrode 14A, and a liquid crystal 16A sealed in a gap between the transparent electrode 13A and the transparent electrode 14A on which the concave-convex portion 17A is provided. On the other hand, the second liquid crystal lens element 10B has the same construction as the first liquid crystal lens element 10A though these elements share the transparent substrate 11.

Then, production process of this embodiment will be described.

First of all, transparent electrodes 14A and 14B are formed on one surface of transparent substrates 12A and 12B respectively. Then, on flat surfaces of these transparent electrodes 14A and 14B, concave-convex portions 17A and 17B are formed respectively, each of which is made of a uniform-reflective-index transparent material of refractive index $n_s$ and having a cross-sectional shape of a saw-tooth shape or a saw-tooth shape approximated by steps. These concave-convex portions 17A and 17B each has one surface fabricated to be the same concave-convex shape having rotational symmetry about an optical axis (Z axis) of incident light. Further, transparent electrodes 13A and 13B are formed on respective surfaces of the transparent substrate 11.

Then, on transparent substrates 12A and 12B, seals 15A and 15B are formed respectively, each of which is formed by printing and thereby patterning an adhesive agent in which a gap control material is mixed. Then, these transparent substrates 12A and 12B and a transparent substrate 11 are laminated so that the rotational symmetry axes of the concave-convex portion 17A and the concave-convex portion 17B coincide with each other, and press-bonded to form an empty cell. Thereafter, a liquid crystal injected from an injection port (not shown) provided on a part of each seal, and the seal the injection port to seal the liquid crystals 16A and 16B in the cell, to form the liquid crystal lens element 30. Further, the transparent electrodes 13A and 13B are conducted together to form a common electrode, and the transparent electrodes 14A and 14B are conducted together to form a common electrode.

In the liquid crystal lens element 10 thus formed, an AC voltage of rectangular wave is applied between the common electrodes by an AC power source 18. As a result, alignment of molecules of the liquid crystals 16A and 16B are changed according to the applied voltage, and substantial refractive indexes of the liquid crystal layers change from $n_e$ to $n_o$. As a result, the refractive index differences Δn from the liquid crystals 16A and 16B to concave-convex portions 17A and 17B, change, and a wavefront of transmission light is changed with respect to that of incident light.

Figure 7:
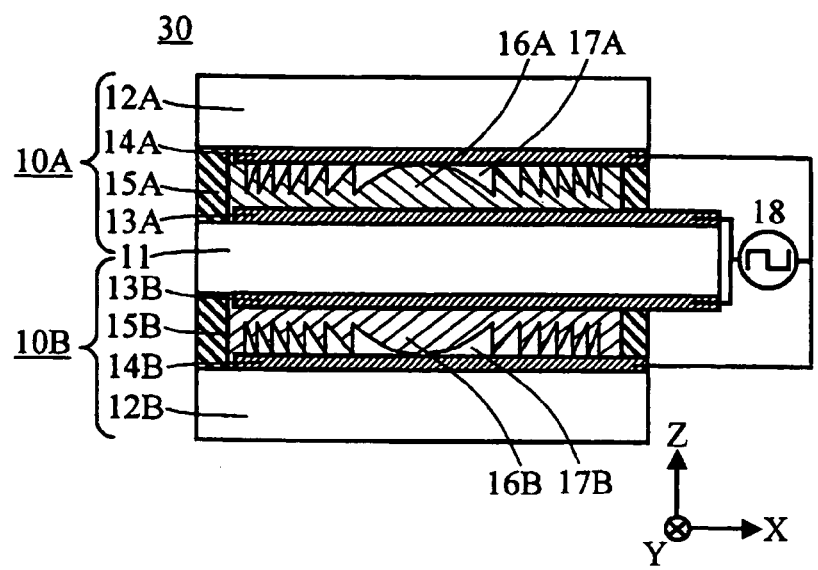
FIG. 7: A cross-sectional side view showing the construction of a liquid crystal lens element of a third embodiment of the present invention, wherein liquid crystal lens elements are laminated so that alignment directions of their liquid crystal molecules are perpendicular to each other.

Constructions and functions of the first and second liquid crystal lens elements 10A and 10B shown in FIG. 7, are the same as the those of the liquid crystal lens element 10 shown in FIG. 1, but different in that alignment directions of liquid crystal molecules of the liquid crystals 16A and 16B, are perpendicular to each other. Namely, in the first and second liquid crystal lens elements 10A and 10B, directions of alignment treatment on interfaces to liquid crystal layers, are perpendicular to each other. As a result, according to this embodiment, lens functions having positive power, no power and negative power shown in FIG. 4(A), FIG. 4(B) and FIG. 4(C) respectively, are obtained according to applied voltage regardless to polarization state of incident light.

Here, at an applied voltage $V_0$ satisfying $\Delta n(V_0)=0$, in a case of incident light corresponding to extraordinarily polarized light to the liquid crystal layer, transmission wavefronts through the first and second liquid crystal lens elements 10A and 10B do not change, but in a case of incident light corresponding to ordinarily polarized light to the liquid crystal layer, transmission wavefronts through the first and second liquid crystal lens elements 10A and 10B, show a predetermined change corresponding to the refractive index difference $n_o-n_s$ regardless of applied voltage.

The first and second liquid crystal lens elements 10A and 10B have liquid crystals 16A and 16B having alignment directions perpendicular to each other, and accordingly, regardless of incident polarization state, a predetermined transmission wavefront change occurs. It is preferred that a correction surface is formed on a surface of the transparent substrate 12A or 12B so as to cancel the predetermined change of transmission wavefront at an applied voltage $V_0$.

Or else, by forming the concave-convex portions 17A and 17B by employing a birefringent material such as a polymer liquid crystal having the same alignment direction as those of the liquid crystal 16A and 16B respectively, and having the same ordinary birefringency, it is possible to prevent change of transmission wavefront through the liquid crystal lens element 30 at the applied voltage $V_0$.

Forth Embodiment

Then, a liquid crystal lens element 40 according to a forth embodiment of the present invention, is described with reference to FIG. 8. Here, in this embodiment, components in common with those of the first and second embodiments, are designated as the same reference numerals to avoid duplication of explanations.

The liquid crystal lens element 40 of this embodiment, is different from the liquid crystal lens element 30 shown in FIG. 7 in the following points of the construction of the first and second liquid crystal lens elements 10A and 10C.

Alignment direction of the liquid crystal of the second liquid crystal lens element 10C, is different from that of the second liquid crystal lens element 10B of the third embodiment, and is the same as the alignment direction of the liquid crystal 16A of the first liquid lens element 10A. Further, the orbicular shape of the concave-convex portion 17C of the second liquid crystal lens element 10C, is different from that of the concave-convex portion 17A, and the optical path differences OPD shown in graph $\alpha$ of FIG. 3 represented by Formula (3), are different from each other. Further, to the liquid crystal 16A and 16C, AC voltages of rectangular wave are independently applied by AC power sources 18A and 18C.

Accordingly, when extraordinarily polarized light having a polarization plane corresponding to alignment directions of the liquid crystals 16A and 16C, is incident, the first and second liquid crystal lens elements 10A and 10C independently function as liquid crystal lenses having different powers from each other.

For example, powers of the first liquid crystal lens element 10A at applied voltages $V_{+1}$, $V_0$ and $V_{-1}$ are designated as $PA_{+1}$, $PA_0(=0)$ and $PA_{-1}$, and powers of the second liquid crystal lens element 10C are designated as $PC_{+1}$, $PC_0$ (=0) and $PC_{-1}$, respectively, and their large-small relationship is assumed to be $PA_{+1}<PC_{+1}<0<PC_{-1}<PA_{-1}$.

Here, by controlling applied voltages by the AC power sources 18A and 18C, the liquid crystal lens element 40 can output seven types of different powers $(PA_{+1}+PC_{+1})$ $<PA_{+1}<PC_{+1}<0<PC_{-1}<PA_{-1}<(PA_{-1}+PC_{-1}))$.

As a result, by employing the liquid crystal lens element 40 of this embodiment in an optical head device, it is possible to correct spherical aberrations containing seven types of power components generated by a difference of cover thicknesses.

Fifth Embodiment

Then, a liquid crystal lens element 50 according to a fifth embodiment of the present invention, is described with reference to FIG. 9. Here, in this embodiment, components in common with those of the first and second embodiments, are designated as the same reference numerals to avoid duplication of explanation.

The liquid crystal lens element 50 of this embodiment has a construction that in the liquid crystal lens 10 according to the first or the second embodiment, a birefringent diffraction grating 51 and an adhesive agent layer 52 are sandwiched between one surface (a surface on which no transparent electrode is provided) of the transparent substrate 12, and a phase plate 22 attached to one surface of the transparent substrate 21.

The birefringent diffraction grating 51 is formed by forming on one surface of the transparent substrate 12 (a surface on which no transparent electrode is provided) a birefringent material layer made of a polymer liquid crystal, and fabricating the layer to have a cross-section of concave-convex grating. Further, with an adhesive agent made of a uniform-refractive-index transparent material, at least concave portions of the birefringent diffraction grating 51 are filled to form an adhesive agent layer 52, and they are bonded with the transparent substrate 21 on which a phase plate 22 is formed.

The birefringent diffraction grating 51 made of a polymer liquid crystal, is subjected to an alignment treatment so that the molecular alignment of the polymer liquid crystal is perpendicular to that of the liquid crystal 16. Namely, an alignment film (not shown) subjected to have an alignment treatment in Y axis direction, is formed on the transparent substrate 12, and a liquid crystal monomer is applied on the substrate and polymerized and cured to form a polymer liquid crystal in which alignment (direction of extraordinary refractive index) is uniformly in Y axis direction. Further, by applying a photolithography and a reactive ion etching, a birefringent diffraction grating 51 having a concave-convex shaped cross-section is formed.

Concave portions of the birefringent diffraction grating 51 are filled with an adhesive agent having substantially the same refractive index as the ordinary refractive index of the polymer liquid crystal, to form an adhesive agent layer 52, whereby a polarizing diffraction grating is formed, which transmits ordinarily polarized light and diffracts extraordinarily polarized light in incident light.

Figure 9:
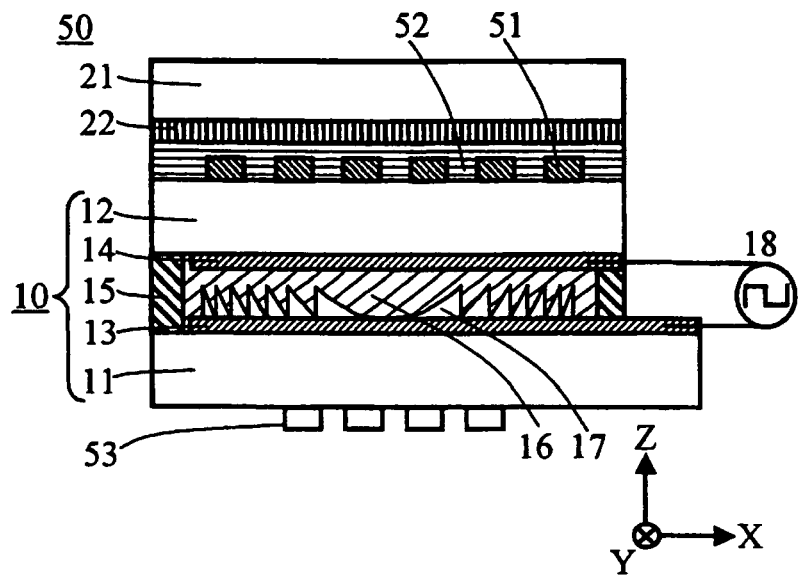
FIG. 9: A cross-sectional side view showing the construction of a liquid crystal lens element of a fifth embodiment of the present invention, wherein a phase plate, a polarizing diffraction grating and a diffraction grating are integrated.

The cross-sectional shape of the birefringent diffraction grating 51 may be a rectangular shape shown in FIG. 9, or a saw-tooth shape to obtain high diffraction efficiency at a specific diffraction order number. In the birefringent diffraction grating 51, by appropriately setting a refractive index difference $\Delta N$ between the extraordinary refractive index of the polymer liquid crystal and the refractive index of the adhesive agent layer 52, and $(\Delta N \times D)$ being a product of $\Delta N$ multiplied of the depth (D) of the concave-convex of the polymer liquid crystal, a desired diffraction efficiency at a desired diffraction order number for extraordinarily polarized incident light of wavelength $\lambda$, can be obtained. Further, by forming a hologram pattern having a predetermined distribution of grating pitch and angle of grating longitudinal direction in a grating plane, diffraction direction of incident light can be spatially controlled.

The phase plate 22 is the same as the phase plate 22 described in the second embodiment (refer to FIG. 6), the optical axis direction of the phase plate 22 is set to be 45° to X axis being the direction of polarization plane of incident light, in XY plane, and the retardation value is set to be ¼ of wavelength λ of incident light.

Further, in the liquid crystal lens element 50 of this embodiment, as shown in FIG. 9, a diffraction grating 53 is formed on a surface of the transparent substrate 11, and the diffraction grating 53 generates 0-th order diffraction light (straight transmission light) and ±1-st order diffraction light from incident light. The diffraction grating 53 is, for example, employed as three-beams for tracking an optical disk in an optical head device.

Then, functions of this embodiment are described.

When linearly polarized light having a polarization plane in X axis direction, is incident into the liquid crystal lens element 50 of this embodiment from the transparent substrate 11 side, transmission wavefront is changed according to the magnitude of voltage applied to the liquid crystal lens element 10 from a AC power source 18, and the transmission wavefront is incident into a polarizing diffraction element constituted by the birefringent diffraction grating 51 and the adhesive agent layer 52, as ordinarily polarized light. Then, light transmitted through the polarizing diffraction grating without being diffracted, is transformed into circularly polarized light by the phase plate 22, and is transmitted through the liquid crystal lens element 50.

On the other hand, when light reflected by a reflecting surface of e.g. an optical disk, not shown, is incident into the liquid crystal lens element 50 from the transparent substrate 21 side again, the liquid is converted into linearly polarized light having a polarization plane in Y axis direction by the phase plate 22, and incident into the polarizing diffraction grating as extraordinarily polarized light, and diffracted by the polarizing diffraction grating and output from the liquid crystal lens element 50.

Thus by integrating the polarizing diffraction grating 51, the phase plate 22 and the diffraction grating 53 into the liquid crystal lens element 10, positioning accuracy is improved as compared with a case of attaching each element independently to a device, and thus, stable performance can be obtained.

Here, a unit in which such a liquid crystal lens element 50 is integrated together with a laser diode and a photodetector, in a single package, (hereinafter referred to as "optical unit 60") is described with reference to FIG. 10.

In the optical unit 60, a laser diode 61 emitting linearly polarized light of wavelength λ having a polarization plane in X axis direction, and a photodetector 62 are fixed to a metal block 63, and accommodated in a package 64. In the photodetector 62, a circuit for amplifying and processing an electric signal converted from a light signal, is integrated. Light-output and input side of the package 64 is provided with an opening, and the liquid crystal lens element 50 is adhered and fixed to the opening to constitute an integrated unit.

When such an optical unit 60 is employed for an optical head device, a liquid crystal lens element is obtained, which has a function of diffraction grating generating three beams for tracking, a function of carrying out aberration correction according to applied voltage, a function of polarizing hologram beam splitter straightly transmitting light in an outgoing path and efficiently separating light to lead it to a photodetector in a returning path, whereby downsizing of an optical head device is realized.

Sixth Embodiment

Then, an optical head device 70 employing the liquid crystal lens element 20 according to the second embodiment of the present invention, for writing and reading optical disks for DVD and CD, is described with reference to FIG. 11. Here, in this embodiment, components in common with those of the second embodiment, are designated as the same reference numerals to avoid duplication of explanation.

The optical head device 70 of this embodiment, comprises a first and second laser diodes 1A and 1B as light sources, first and second diffraction gratings 2A and 2B, a dichroic prism 3, a beam splitter 4, a collimator lens 5, an objective lens 6, a cylindrical lens 7 and a photodetector 8, and further, a liquid crystal lens element 20 disposed in an optical path between the beam splitter 4 and the collimator lens 5.

Then, functions of this embodiment are described.

Figure 11:
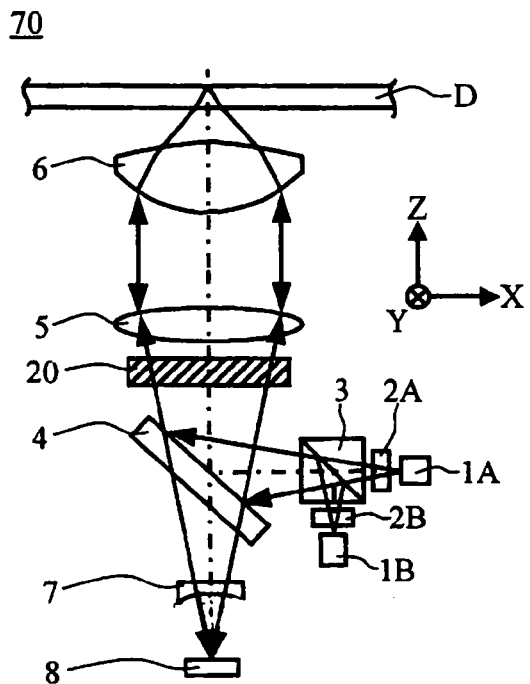
FIG. 11: A construction view showing an optical head device of a sixth embodiment, which employs a liquid crystal lens element according to the second embodiment of the present invention.

(i) For an optical disk for DVD:

Emission light of wavelength $\lambda_1$(=660 nm) having a polarization plane in a document face of FIG. 11, emitted from a laser diode 1A for DVD, generates three beams for tracking by the diffraction grating 2A. Then, the light is transmitted through the dichroic prism 3, reflected by the beam splitter 4, and incident into the liquid crystal lens element 20. Light transmitted through the liquid crystal lens element 20, becomes circularly polarized light, transformed into parallel light by the collimator lens 5, and is converged on an information recording layer of an optical disk D for DVD by the objective lens 6.

Here, the objective lens 6 is moved by an actuator (not shown) for focus servo and tracking servo. Light reflected by a reflecting surface of the optical disk D, is transmitted again through the objective lens 6, the collimator lens 5 and the liquid crystal lens element 20, and thereby becomes linearly polarized light having a polarization plane perpendicular to the document face, and a part of the light is transmitted through the beam splitter 4. Then, the light is transmitted through the cylindrical lens 7 provided for focus servo of an astigmatism method, and converged on the photodetector 8. Here, light reflected by the beam splitter 4 is returned through the optical path through which the light came out, and converged on an emission point of the laser diode 1A, but since the light is linearly polarized light having a polarization plane perpendicular to that of the laser emission light, laser emission is not adversely affected and laser emission intensity is stable.

(ii) For an optical disk for CD:

Emission light of wavelength $\lambda_2$(=790 nm) having a polarization plane perpendicular to the document face, output from a laser diode 1B for CD, generates three beams for tracking by the diffraction grating 2B, reflected by the dichroic prism 3, propagated in the same optical axis as that of the light of wavelength $\lambda_1$ for DVD, and reflected by the beam splitter 4. Then, the reflected light is converged on an information recording layer of an optical disk D for CD by the collimator lens 5 and the objective lens 6 in the same manner as the light of $\lambda_1$ for DVD. Further, optical path after reflected by the reflecting plane of the optical disk, is the same as the optical path of the light of wavelength $\lambda_1$ for DVD.

In the optical head device 70 of this example, when laser diodes 1A and 1B having high emission output, are employed, in order to make the polarization plane of light returning to laser emission point perpendicular to the polarization plane of laser emission light, it is preferred to make the phase plate 22 (refer to FIG. 6) in the liquid crystal lens element 20, to be a quarter waveplate for wavelength $\lambda_1$ and wavelength $\lambda_2$.

Specifically, polymer liquid crystal layers having retardation values of ¼ wavelength and ½ wavelength respectively to the intermediate wavelength between wavelength $\lambda_1$ and wavelength $\lambda_2$, may be laminated so that their optical axes are at a desired angle to each other.

Then, writing and reading operations of the optical head device 70 employing the liquid crystal lens element 20 (refer to FIG. 6), to optical disks D of single layer and double layer for DVD writing and reading, that have different cover thicknesses from each other, are described as follows.

(i) For a single layer optical disk (cover thickness is 0.60 mm):

Since the objective lens 6 is designed so that its aberration is minimized for the single layer optical disk D having a cover thickness of 0.60 mm, an AC voltage $V_0$ is applied between the electrodes of the liquid crystal lens element 20 at a time of writing and/or reading a single layer optical disk D. Here, since refractive indexes of the liquid crystal 16 and the concave-convex portion 17, are equal, transmission wavefront is not changed as shown in FIG. 4(B).

(ii) For a double layer optical disk (cover thickness is 0.57 mm):

At a time of recording and/or reading the information recording layer of the double layer optical disk having a cover thickness of 0.57 mm, a AC voltage $V_{+1}$ is applied between the electrodes of the liquid crystal lens element 20 so that transmission wavefront through the liquid crystal lens element 20 becomes a slightly converging spherical wave.

Here, since the liquid crystal 16 has a refractive index larger than that of the concave-convex portion 17, the transmission wavefront having a positive power, namely, a transmission wavefront corresponding to a convex lens, is formed as shown in FIG. 4(A). Namely, by the objective lens 6, light is efficiently converged on the information recording layer of the cover thickness 0.57 mm.

(iii) For a single layer optical disk (cover thickness is 0.63 mm):

At a time of writing and/or reading the information recording layer, not shown, of a cover thickness of 0.63 mm, an AC voltage $V_{-1}$ is applied between the electrodes so that a transmission wavefront through the liquid crystal lens element 20 becomes a slightly diverging spherical wave. Here, since the liquid crystal 16 has a smaller refractive index than the concave-convex portion 17, as shown in FIG. 4(C), a transmission wavefront having a negative power, namely, a transmission wavefront corresponding to a concave lens, is obtained. Namely, by the objective lens 6, light is efficiently converged on the information recording layer having a cover thickness of 0.63 mm.

Accordingly, by switching the applied voltage among $V_0$, $V_{+1}$ and $V_{-1}$ to the liquid crystal lens element 20, stable writing and reading to/from a single layer optical disk and a double layer optical disk for DVD having different cover thicknesses, are realized.

Thus, according to the optical head device 70 of this embodiment, the liquid crystal lens element 20 can not only correct a spherical aberration generated by a difference of cover thicknesses optical disks D, but also add a function of switching power components corresponding to change of focal point. Accordingly, for example, even in a case where the optical head device 70 is used as it is disposed separately from the objective lens 6, and the objective lens 6 is moved in a radial direction of the optical disk D at a time of tracking to cause a positional error to the liquid crystal lens element 20, deterioration of aberration is very small. As a result, as compared with a liquid crystal element for correcting only spherical aberration, stable writing and/or reading is realized.

Further, in the liquid crystal lens element 20, by making the concave-convex portion 17 to have a shape corresponding to m=2 or 3 in Formula (2), it becomes possible to switch transmission wavefront among 5 types or 7 types respectively, whereby further fine aberration correction becomes possible for optical disks having different cover thicknesses.

Further, instead of the liquid crystal lens element 20, by employing the liquid crystal lens element 30 of the third embodiment shown in FIG. 7, since the liquid crystal lens element 30 has a correction function not only to polarized light in the outgoing path but also to polarized light in the returning path having a polarization plane perpendicular to that of the outgoing path, convergence to the photodetector can also be improved.

Figure 8:
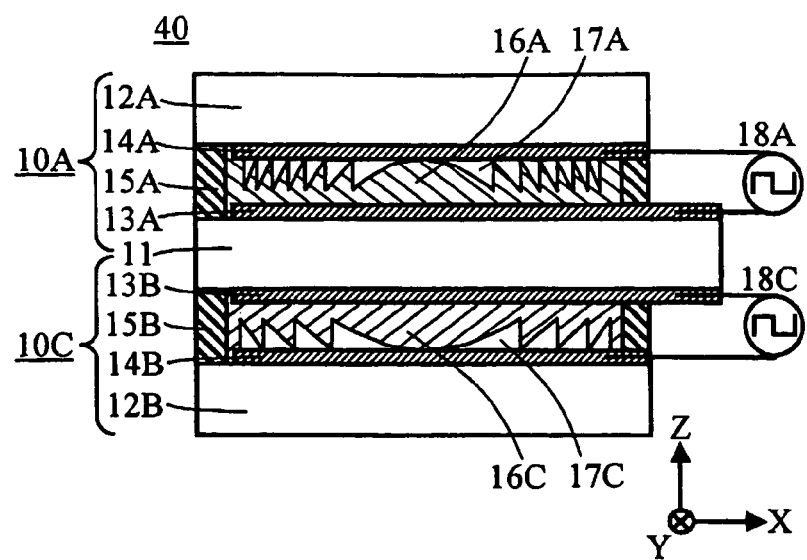
FIG. 8: A cross-sectional side view showing the construction of a liquid crystal lens element of a forth embodiment of the present invention, wherein liquid crystal lens elements for switching different transmission wavefronts, are laminated.

Further, by employing the liquid crystal lens element 40 of the forth embodiment shown in FIG. 8 instead of the liquid crystal lens element 20, it is possible to carry out not only the aberration correction for optical disks of three types of different cover thicknesses, but also aberration correction for optical disks of other cover thicknesses, is possible. Accordingly, further fine aberration correction is possible for an optical disk having a variation in cover thickness or in a case where there is residual spherical aberration in an optical system of the entire optical head device.

Here, in the liquid crystal lens 20, since linearly polarized light having a polarization plane perpendicular to that of outgoing path, is incident into the liquid crystal of the liquid crystal lens element 20 as ordinarily polarized light, a constant transmission wavefront change corresponding to the refractive index difference $n_o - n_s$, is generated. To cancel this, a correction element may be formed, which has a correction surface made of a birefringent material such as a polymer liquid crystal and having a shape corresponding to the concave-convex shape of the liquid crystal 16, and whose concave portions are filled with a uniform-refractive-index filler. Here, the refractive indexes of the birefringent material and the filler are adjusted so that an optical path difference is formed for ordinarily polarized light and no optical path difference is formed for extraordinarily polarized light.

Here, since polarized light of wavelength $\lambda_2$ for CD is incident into the liquid crystal of the liquid crystal lens element 20 as ordinarily polarized light, transmission wavefront is not changed regardless to an applied voltage to the liquid crystal lens element 20.

Namely, stable writing/reading of an optical disk for CD is possible without causing deterioration of aberration.

Figure 12:
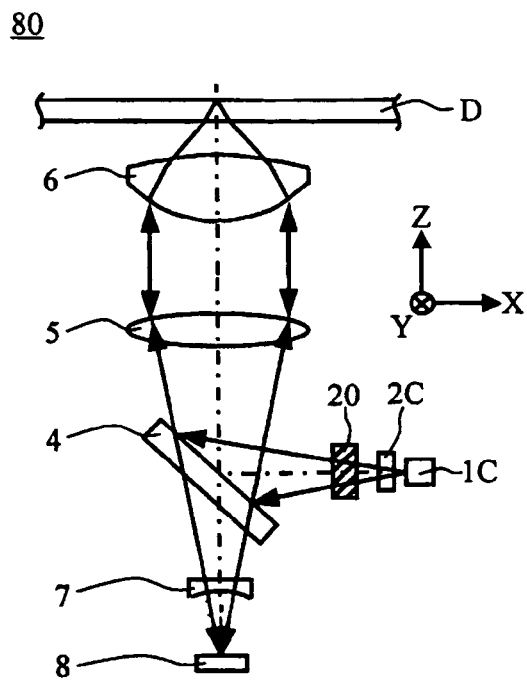
FIG. 12: A construction view showing a modified example of the optical head device of the sixth embodiment, which employs a liquid crystal lens element according to the second embodiment of the present invention.

Here, as in a case of an optical head device 80 schematically shown in FIG. 12, in a case of employing a double wavelength light source 1C in which a laser diode for DVD and a laser diode for CD are disposed in a single package so that their emission points are at a distance of about 100 μm from each other, a simple construction is realized.

The optical head device 80 employs a diffraction grating 2C having a wavelength selectivity, as three-beam generating element for tracking, instead of the diffraction gratings 2A and 2B in FIG. 11.

The diffraction grating 2C having a wavelength selectivity, is a diffraction grating which transmits light of wavelength $\lambda_1$ for DVD without diffraction and diffracts light of wavelength $\lambda_2$ for CD, or a diffraction grating which transmits light of wavelength $\lambda_2$ for CD without diffraction and diffracts light of wavelength $\lambda_1$ for DVD, or an element formed by laminating these diffraction gratings, whereby generation of unnecessary stray light is prevented and high light-utilization efficiency, is obtained.

Further, in the optical head device 80, by disposing a liquid crystal lens element 20 in an optical path between the double wavelength light source 1C and the beam splitter 4, downsizing of the device is achieved. Further, integrating of the diffraction grating 2C having a wavelength selectivity, to the liquid crystal lens element 20, leads to further downsizing of the device.

Here, in this embodiment, an optical head device 80 is described, which employs a liquid crystal lens element 20 functioning to single layer and double layer optical disks D for DVD using as a light source a laser diode in a 660 nm wavelength band. However, an optical head device employing a liquid crystal lens element functioning to single layer and double layer optical disks for BD using as a light source a laser diode in a 405 nm wavelength band, provides equivalent functions and effects.

Seventh Embodiment

An optical head device 90 according to the seventh embodiment of the present invention, is described with reference to FIG. 13. Here, in this embodiment, components in common with those of the sixth embodiment are designated with the same reference numerals to avoid duplication of explanation.

The optical head device 90 of this embodiment, comprises a unit 90A for DVD, a unit 90B for CD, a dichroic prism 3, a collimator lens 5 and an objective lens 6.

Figure 10:
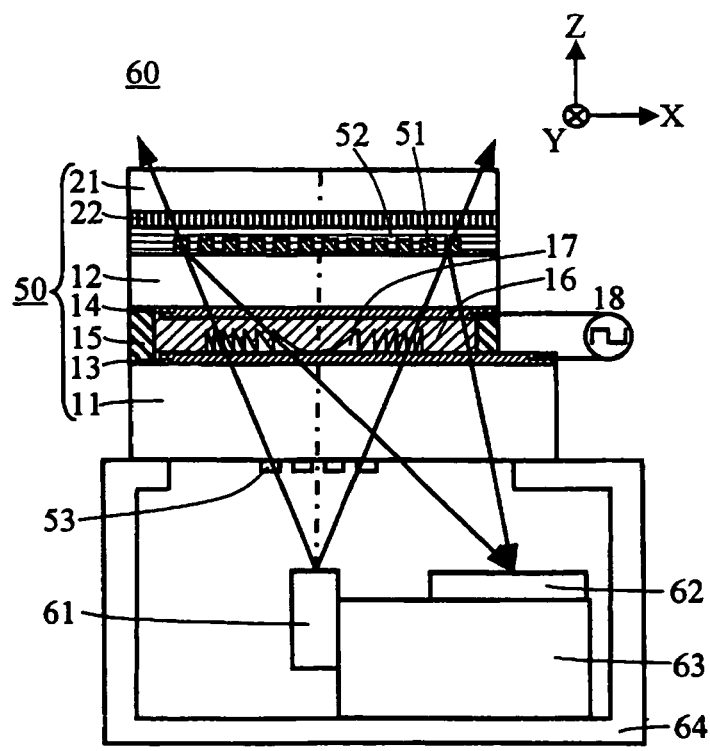
FIG. 10: A side view showing an example of the construction of an optical unit according to the present invention, wherein a light source and a photodetector are accommodated in a single package, and they are integrated with a liquid crystal lens element.

The unit 90A for DVD, is the optical unit 60 described in the fifth embodiment and shown in FIG. 10, namely, a unit in which a laser diode 1A(61) for DVD, a photodetector 8A(62) and a liquid crystal lens element 50 are adhered and fixed to a package, not shown, and integrated to be a unit. Meanwhile, the unit for CD is a unit in which a laser diode 1B for CD, a photodetector 8B and a hologram beam splitter 4B are integrated in a package.

Then, functions of this embodiment are described.

(i) Regarding writing and/or reading an optical disk for DVD:

For writing and/or reading an optical disk for DVD, the unit 90A for DVD, namely, the optical unit 60, is employed.

Figure 13:
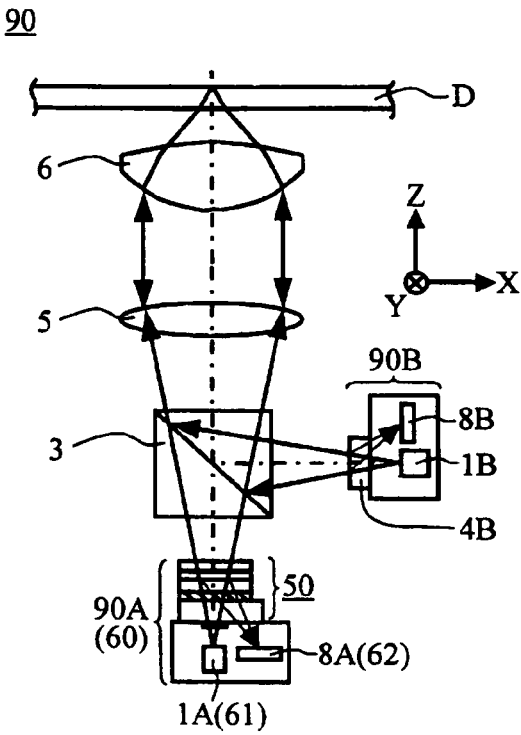
FIG. 13: A construction view showing an optical head device of the seventh embodiment of the present invention, which employs an optical unit in which the liquid crystal lens element of the fifth embodiment of the present invention is integrated.

Emission light of wavelength $\lambda_1$(=660 nm) having a polarization plane in a document face of FIG. 13, emitted from the laser diode 1A for DVD, is transmitted through the liquid crystal lens element 10 to be circularly polarized three beams, and are transmitted through the dichroic prism 3. Then, the transmission light beams are each transformed into parallel light by the collimator lens 5, and converged on an information recording layer of an optical disk D for DVD by the objective lens 6.

Further, light reflected by a reflecting plane of the optical disk D, returns through the objective lens 6, the collimator lens 5 and the dichroic prism 3, and further transmitted through the phase plate 22 (refer to FIG. 9) as a quarter waveplate in the liquid crystal lens element 50. Then, the transmission light becomes linearly polarized light having a polarization plane perpendicular to the document face of FIG. 13, and diffracted by a polarizing diffraction grating (refer to FIG. 9) constituted by a birefringent diffraction grating 51 being a hologram beam splitter in the liquid crystal lens element 50 and an adhesive agent layer 52, to be efficiently converged on a photo-acceptance plane of the photodetector 8A.

(ii) Regarding writing/reading an optical disk for CD:

Meanwhile, for writing/reading an optical disk for CD, a unit 90B for CD in which a laser diode 1B for CD, a photodetector 8B and a hologram beam splitter 4B are integrated in a package, is employed.

Light of wavelength $\lambda_2$(=790 nm) emitted from the laser diode 1B, is transmitted through a hologram beam splitter 4B integrated with a diffraction grating generating three beams for tracking.

Then, the transmission light is reflected by the dichroic prism 3 and propagates in the same optical axis as the light of wavelength $\lambda_1$ for DVD, and is converged on an information recording layer of an optical disk D for CD by the collimator lens 5 and the objective lens 6.

Further, light reflected by the reflecting plane of the optical disk D, is reversely transmitted again through the objective lens 6 and the collimator lens 5, reflected by the dichroic prism 3, and further, a part of the light is diffracted by the hologram beam splitter 4B, and converged on a photo-acceptance plane of the photodetector 8B.

Thus, in this embodiment, operation of stably writing and/or reading single layer and double layer optical disks D for DVD having different cover thickness is the same manner of that of the sixth embodiment. Accordingly, according to the optical head device 90 of this embodiment, assembly and adjustment of the optical head device 90 becomes simple, which leads to downsizing and light weight of entire device.

EXAMPLES

Example 1

Then, a specific example of a liquid crystal lens element 20 of the present invention shown in the second embodiment, is described with reference to FIG. 6.

First of all, a production process of the liquid crystal lens element 20, is described.

On a glass substrate being a transparent substrate 11, a transparent conductive film (ITO film) is formed as a transparent electrode 13. On the transparent electrode 13, a photosensitive polyimide being a uniform-refractive-index material having a refractive index of $n_s$(=1.66), is applied so that the photosensitive polyimide has a film thickness of d(=5.5 μm).

Then, using a gradation mask whose UV transmittance is distributed in a radial direction so as to correspond to the shape of graph β of FIG. 3, the photosensitive polyimide is irradiated with ultraviolet rays to print the gradation mask pattern, and the photosensitive polyimide is developed. As a result, in a region of effective diameter φ (=4.9 mm), a concave-convex portion 17 shown in FIG. 6 having a saw-tooth-shaped cross-section and having a rotational symmetry about the optical axis (Z axis) of incident light, is formed by fabrication. Further, a surface of the concave-convex portion 17 made of polyimide, is subjected to a rubbing alignment treatment in X axis direction. As a transparent material for the concave-convex portion 17 made of polyimide thus obtained, a material having a resistivity $\rho_F$ at least $10^6$ lower than the resistivity $\rho_{LC}$ of the liquid crystal 16, is employed.

Further, on a glass substrate being a transparent substrate 12 on which a transparent conductive film (ITO film) is formed as a transparent electrode 14, a polyimide film is applied to have a film thickness of about 50 nm and baked, and a surface of the polyimide film is subjected to a rubbing alignment treatment in X axis direction. Further, on the surface, an adhesive agent in which a gap control material having a diameter of 7 μm is mixed, is patterned by printing to form a seal 15, and a transparent substrate 11 is laminated and press-bonded to form an empty cell in which the distance between transparent electrodes is 7 μm.

Figure 6:
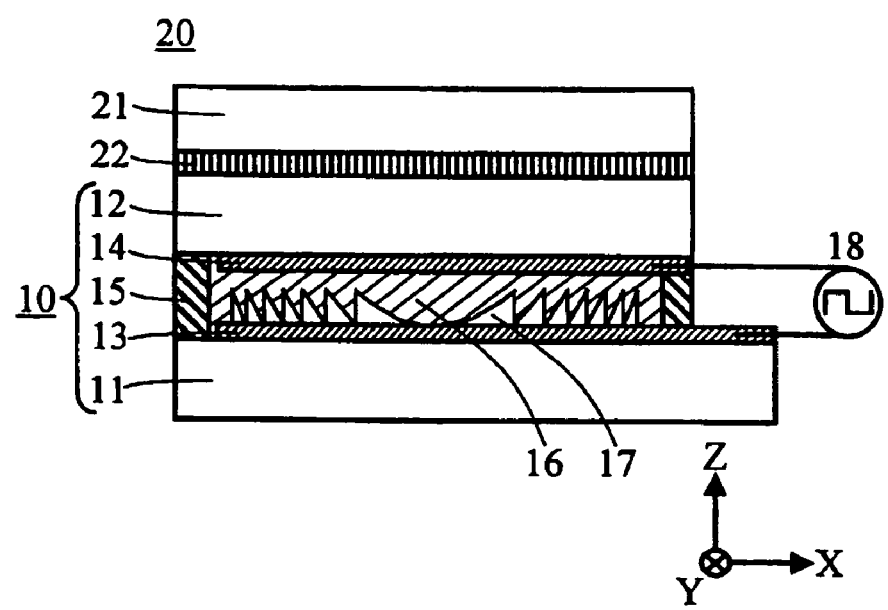
FIG. 6: A cross-sectional side view showing the construction of the liquid crystal lens element of a second embodiment of the present invention in which a phase plate is integrated.

Thereafter, a liquid crystal 16 is injected through an injection port (not shown) of the empty cell, and seal the injection port to form liquid crystal lens element 10 shown in FIG. 6.

For the liquid crystal 16, a nematic liquid crystal having an ordinary refractive index $n_o(=1.50)$, an extraordinary refractive index $n_e(=1.78)$ and positive dielectric anisotropy, is employed. Further, concave portions of the concave-convex portion 17 are filled with the liquid crystal 16 having an alignment of liquid crystal molecules uniformly in parallel with the planes of the transparent electrodes 13 and 14 and in the direction of X axis. Here, since slopes of the saw-tooth-shaped concave-convex portion 17 has slope angles of at most 3°, the alignment of liquid crystal molecules can be regarded to be in parallel with the transparent electrode surfaces.

Then, on a glass substrate being a transparent substrate 21, a polyimide film is applied to have a film thickness of about 50 nm and baked, and a surface of the polyimide film is subjected to a rubbing alignment treatment in a direction at an angle of 45° to X axis.

On the polyimide film, a liquid crystal monomer is applied to have a film thickness of 6.6 μm, polymerized and cured to form a phase plate 22 made of a polymer liquid crystal film having a slow axis uniformly in a direction at an angle of 45° C. to X axis, and in which the difference between an ordinary refractive index and an extraordinary refractive index is 0.20. Then, by adhering and fixing the phase plate 22 and the transparent substrate 12 with an adhesive agent, e.g. the transparent substrate 21 is fixed to the liquid crystal lens element 10 to form a liquid crystal lens element 20.

The retardation value (Rd) of the phase plate 22 is:

$$Rd = 0.20 \times 6.6$$
$$= 1.32 \text{ μm}$$

which corresponds to 5/4 times of the wavelength $\lambda(=660$ nm) for DVD, and the phase plate 22 has a function of quarter waveplate.

By connecting an AC power source 18 to the transparent electrodes 13 and 14 of the liquid crystal lens element 20 thus obtained, voltage fall in the concave-convex portion 17 becomes very small, which corresponds to the condition of Case 1 shown in the first embodiment, and a voltage is applied to the liquid crystal 16 effectively. When the applied voltage is increased from 0 V, an effective refractive index of the liquid crystal (layer) 16 in X axis direction changes from $n_e(=1.78)$ to $n_o(=1.50)$. As a result, a refractive index difference (Δn) between the liquid crystal 16 and the concave-convex portion 17 for linearly polarized incident light having a polarization plane in X axis, changes from:

$$\Delta n_{max}(=n_e-n_s)=0.12$$

(here, $n_s=1.66$)

to:

$$\Delta n_{min}(=n_o-n_s)=-0.16$$

and a transmission wavefront changes depending on the thickness distribution of the liquid crystal 16 filling concave portions of the concave-convex portion 17.

Here, for example, when an objective lens designed to have zero aberration for a single layer optical disk for DVD having a cover thickness of 0.60 mm at a wavelength $\lambda(=660$ nm) in use, and having a numerical aperture (NA) of 0.65 and a focal length of 3.05 mm, is used for a double layer optical disk for DVD having cover thicknesses 0.57 mm and 0.63 mm, a spherical aberration corresponding to a maximum optical path difference of 0.15 λ and a mean square wavefront aberration of 43 mλ [rms], is generated.

Then, in order to correct this spherical aberration using the liquid crystal lens element 20, the concave-convex portion 17 is fabricated so that a transmission wavefront at no applied voltage correspond to the optical path difference OPD represented by Formula (3) using parameters $a_1$ to $a_5$ shown in Table 1 below. Here, in Formula (3), the unit of optical path difference OPD is [μm] and the unit of r is [mm].

TABLE 1

| Parameter | Value |
|---|---|
| $a_1$ | −0.744431 |
| $a_2$ | 0.004292 |
| $a_3$ | −0.004880 |
| $a_4$ | 0.001341 |
| $a_5$ | −0.000112 |

Thus, using the parameters $a_1$ to $a_5$ of Table 1, an optical path difference corresponding to graph α of FIG. 3 represented by Formula (3), is obtained, and from the graph α, an integer times of wavelength λ is submitted to obtain a wavefront having an optical path difference shown as graph β of FIG. 3 (corresponding to an optical path of at least 0 and at most λ).

Here, since the refractive index difference (Δn) between the liquid crystal 16 and the concave-convex portion 17 at a time of no voltage application, is as described above:

$$\Delta n(=n_e-n_s)=0.12$$

then, in order to produce the above-mentioned transmission wavefront by the concave-convex portion 17 and the liquid crystal 16 filling its concave portions, the above-mentioned Formula (4) may be satisfied. Namely, in Formula (2), when m=1, a depth d (μm) of the concave-convex portion 17 is determined so that the maximum optical path difference corresponds to a wavelength $\lambda=660$ nm ($=0.66$ μm) from the following formula:

$$\Delta n \times d = 0.66 \text{ μm}$$

For this reason, the concave-convex portion 17 is fabricated to have a cross-sectional shape shown in FIG. 1 with the thickness (d) of d=5.5 μm. Here, the saw-tooth-shaped concave-convex portion 17 may be approximated by steps. In order to produce a smooth transmission wavefront corresponding to graph α of FIG. 3, the depth (d) of the concave-convex portion 17 preferably satisfies the following formula:

$$(0.75 \times \lambda/\Delta n) \leq d \leq (1.25 \times \lambda/\Delta n)$$

Further, since the effective diameter of the concave-convex portion 17 is 4.9 mm, the maximum radius is 2.45 mm.

A transmission wavefront of wavelength $\lambda(=660$ nm) for DVD incident into the liquid crystal lens element 20, becomes a converging light as shown in FIG. 4(A) at a time of no voltage application ($V_{+1}=0$), and the element shows a function of convex lens having a focal length (f) of f=675 mm. Then, when the applied voltage is increased, Δn becomes Δn($V_0$)=0 at about $V_0$=2.5 V, and the transmission wavefront is, as shown in FIG. 4(B), transmitted with the same wavefront as the incident wavefront (having no power). When the applied voltage is further increased, Δn becomes Δn($V_{-1}$)=−Δn($V_{+1}$) at about $V_{-1}$=6 V, and the transmission wavefront becomes a diverging light as shown in FIG. 4(C), and the element shows a function of concave lens having a focal length (f) of f=−675 mm.

Example 2

Then, a specific example of the optical head device 70 of the sixth embodiment shown in FIG. 11 employing the liquid crystal lens element 20 of Example 1, is described. Here, the construction of the optical head device 70 is described in the sixth embodiment, and thus the explanation is omitted.

At a time of writing or reading a single layer optical disk D for DVD having a cover thickness of 0.60 mm, when the applied voltage to the liquid crystal lens element 20 is set to be $V_0$=2.5 V, incident light is converged on an information recording layer by an objective lens 6.

In a case of double layer optical disk D for DVD, when an applied voltage to the liquid crystal lens element 20 is set to be about $V_{+1}$(=0 V), incident light is converged on an incident recording layer of a cover thickness of 0.57 mm, and when the applied voltage is set to be about $V_{-1}$(=6 V), incident light is converged on an information recording layer of a cover thickness of 0.63 mm. In each case, residual mean square wavefront aberration is calculated to be at most 3 mλ [rms].

Here, in a case where the cover thickness is within a range of from 0.555 mm to 0.585 mm, by applying an applied voltage $V_{+1}$, in a case where the cover thickness is from 0.585 mm to 0.615 mm, by applying an applied voltage $V_0$, and in a case where the cover thickness is within a range of from 0.615 mm to 0.645 mm, by applying an applied voltage $V_{-1}$, calculated residual mean square wavefront aberration decreases to be at most 20 mλ [rms] in each case.

Further, when the objective lens 6 moves about ±0.3 mm in a radial direction in an optical disk D for tracking, misalignment to the liquid crystal lens element 20 occurs, but since no aberration is generated due to the misalignment, no deterioration of converging spot occurs.

Accordingly, by switching an applied voltage among $V_0$, $V_{+1}$ and $V_{-1}$ to the liquid crystal lens element 20, an optical head device is realized, which can stably write and read single layer and double layer optical disks D for DVD.

Example 3

Then, an example of the liquid crystal lens element 20 of the present invention shown in Example 1, in which a material having an electric volume resistivity $\rho_F$ equivalent or higher than the volume resistivity $\rho_{LC}$ of the liquid crystal 16, is employed for the transparent material of the concave-convex portion 17, is described below with reference to FIG. 6. Here, the element construction other than the concave-convex portion 17 and the liquid crystal 16, is the same as that of Example 1, and thus, explanation of the corresponding portion is omitted.

First of all, a production method of the concave-convex portion 17 of the liquid crystal lens element 20, is described.

On a transparent electrode 13 formed on a glass substrate being a transparent substrate 11, a film of $SiO_xN_y$ (here, x and y shows element proportions of O and N) being a uniform-refractive-index material of refractive index $n_s$(=1.507) equivalent to an ordinary refractive index $n_o$ of the liquid crystal 16, is formed by a sputtering method. Here, by using a Si sputtering target and an arcing gas being an Ar gas mixed with oxygen and nitrogen, a $SiO_xN_y$ film having a film thickness d (=2.94 μm), being transparent and having a uniform refractive index of refractive index $n_s$, is formed. The $SiO_xN_y$ film has a relative dielectric constant $\epsilon_F$ of 4.0 and an electric volume resistivity $\rho_F$ of at least $10^{10}$ Ω·cm.

Further, a resist is patterned by a photolithography method using a photomask so as to correspond to the shape of graph γ of FIG. 3, and the $SiO_xN_y$ film is fabricated by a reactive ion etching method. As a result, a region of effective diameter φ (=4.9 mm) is fabricated to be a convex type Fresnel lens shape which is a reversed concave-convex shape from the concave-convex portion 17 shown in FIG. 1, in which the saw-tooth cross-sectional shape of Fresnel lens is approximated by eight-steps.

Namely, in FIG. 6, the central portion of the Fresnel lens shape of the concave-convex portion 17 has a concave shape, but in this example, the central portion of the Fresnel lens shape has a convex shape. By making the central portion a convex shape rather than a concave shape, average thickness of the liquid crystal layer can be reduced and thus, it is possible to increase voltage response speed at a time of switching focal points.

Then, a transparent conductive film (ITO film) is formed on a surface of the concave-convex portion 17, as a first transparent electrode 13. Further, on the first transparent electrode 13, a polyimide film (not shown) is applied so as to have a film thickness of about 50 nm, and baked, and a surface of the polyimide film is subjected to a rubbing alignment treatment in X axis direction to form an alignment film.

On a glass substrate being a transparent substrate 12 on which a transparent conductive film (ITO film) is formed as a transparent electrode 14, a polyimide film is applied to have a film thickness of 50 nm, and baked, and a surface of the polyimide film is subjected to a rubbing alignment treatment in X axis direction. Further, on the polyimide film, an adhesive agent in which a gap control material having a diameter of 15 μm is mixed, is patterned by printing to form a seal 5, a transparent substrate 11 is laminated and press-bonded together, to form an empty cell in which the distance G between the transparent electrodes is 15 μm.

Thereafter, a liquid crystal 16 is injected from an injection port (not shown) of the empty cell, and the injection port is sealed to form a liquid crystal lens element 10 shown in FIG. 6.

For the liquid crystal 16, a nematic liquid crystal having an ordinary refractive index $n_o$(=1.507) and an extraordinary refractive index $n_e$(=1.745) and having a positive dielectric anisotropy, is employed. Further, concave portions of the concave-convex portion 17 are filled with a liquid crystal 16 having a homogeneous alignment in which alignment of liquid crystal molecules are uniformly in X axis direction and in parallel with is planes of the transparent electrodes 13 and 14. With respect to the relative dielectric constant $\epsilon_{LC}$ of the liquid crystal 16, the relative dielectric constant $\epsilon_{//}$ in a long axis direction of liquid crystal molecules is 15.2, and the relative dielectric constant $\epsilon_\perp$ in a short axis direction of liquid crystal molecules is 4.3, and thus the liquid crystal has a positive dielectric anisotropy. Further, the electric volume resistivity $\rho_{LC}$ of the liquid crystal 16 is at least $10^{10}$ Ω·cm. Here, the phase plate 22 is produced in the same manner as in Example 1.

To the transparent electrodes 13 and 14 of the liquid crystal lens element 20 thus obtained, an AC power source 18 is connected to apply rectangular AC voltage V of frequency f=1 kHz. Since this case corresponds to Case 2 shown in the first embodiment, the ratio $V_{LC}/V$ of the applied voltage $V_{LC}$ distributed to the liquid crystal (layer) 16 based on an applied voltage to the transparent electrode 13 and 14, relates to Formula (5) according to the film thickness $d_F$ of the concave-convex portion 17 and the film thickness $d_{LC}$ of the liquid crystal (layer) shown in FIG. 5, and a voltage distribution $V_{LC}$ corresponding to the Fresnel lens shape of the concave-convex portion 17, is formed. As a result, in response to linearly polarized incident light having a polarization plane in X axis, an optical path difference OPD between the transparent electrodes is distributed as described in the following formula consequently to the distribution of the film thickness $d_F$ of the concave-convex portion 17. Since the central portion of the Fresnel lens shape is a convex shape, the formula is different from Formula (6) showing the case where the central portion is a concave shape.

$$OPD = n(V_{LC}[d_F]) \times (G - d_F) - n(V_{LC}[d]) \times (G - d) - n_s \times (d - d_F)$$

The film thickness $d_F$ of the concave-convex portion 17 made of a $SiO_xN_y$ film, distributes from d to zero, and the optical path difference OPD with respect to the central portion of the Fresnel lens shape, distributes from zero to $OPD_d$ of the following formula.

$$OPD_d = \{n(V_{LC}[d]) - n_s\} \times d - \{n(V_{LC}[d]) - n(V)\} \times G$$

At a time of no voltage application between the transparent electrodes, since $V = V_{LC}[d] = 0$ and thus $n(O) = n_e$, an optical path difference $OPD_d$ becomes a value of the following formula.

$$OPD_d = (n_e - n_s) \times d$$
$$= 0.238 \times 2.94$$
$$= 0.70 \text{ μm}$$

When an applied voltage between the transparent electrodes is increased, $OPD_d$ decreases, and their applied voltages $V_{-1}$, $V_0$ and $V_{+1}$ ($V_{-1} < V_0 < V_{+1}$) making $OPD_d$ +λ, zero and −λ at a wavelength λ=660 nm for DVD, are present. Accordingly, when applied voltage is switched among $V_{-1}$, $V_0$ and $V_{+1}$, a plane wave of wavelength λ=660 nm incident into the liquid crystal lens element 20, becomes transmission wavefronts corresponding to γ of FIG. 3, OPD=0 and β of FIG. 3 at the respective voltages. Namely, the liquid crystal lens element 20 produces a transmission wavefront corresponding to the negative power shown in FIG. 4(C) at an applied voltage $V_{-1}$, generates a transmission wavefront corresponding to no power shown in FIG. 4(B) at an applied voltage $V_0$, and shows a transmission wavefront corresponding to positive power shown in FIG. 4(A) at an applied voltage $V_{+1}$.

Figure 14:
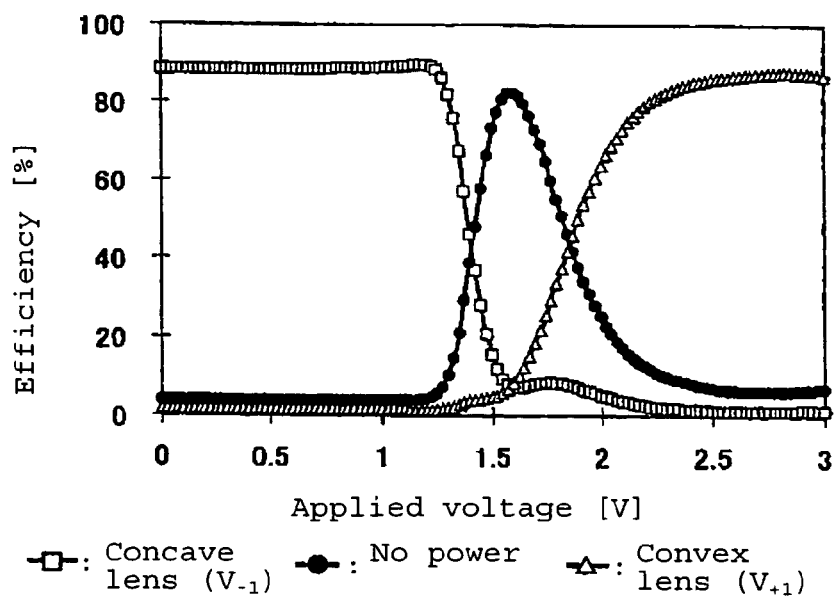
FIG. 14: A graph showing an example of measurement of switching focal points of the liquid crystal lens element of the present invention by changing voltage.

Disposing a condenser lens in a light-output side of the liquid crystal lens element 20, operation of three-focal-length variable liquid crystal lens element is confirmed by confirming that converging points can be switched in response to switching of an applied voltage among $V_{-1}$, $V_0$ and $V_{+1}$. FIG. 14 shows an example of measurement data of converging efficiency of light output from the liquid crystal lens element 20 in response to extraordinarily polarized incident light of wavelength λ=660 nm, when a limiting aperture and a photodetector are disposed at each converging point and an applied voltage V between the transparent electrodes of the liquid crystal lens element 20, is changed.

The liquid crystal lens element 20 shows a negative power (concave lens) in an applied voltage $V_{-1}$ region of from 0 to 1.2 V, and shows no power (no lens function) in an applied voltage $V_0$ region of 1.6 V, and shows a positive power (convex lens) in an applied voltage $V_{+1}$ region of from 2.5 to 3 V. Here, the reason that the light-converging efficiency is less than 100%, is error of the fabrication shape of the concave-convex portion from an optimum shape, and diffraction loss at a plurality of interfaces between materials having different refractive index, and improvement of the light-converging efficiency is possible.

Further, since the refractive index $n_s$ of the concave-convex portion 17 made of a $SiO_xN_y$ being a uniform-refractive-index material, is approximately equal to the ordinary refractive index $n_o$ of the liquid crystal 16, when ordinarily polarized light is incident into the liquid crystal lens element 20, transmission wavefront is not changed. For ordinarily polarized incident light, high transmittance of 98% without changing transmission wavefront (no power), was obtained regardless of an application voltage between the transparent electrodes of the liquid crystal lens element 20 and regardless of wavelength of incident light.

In the same manner as Example 2, the liquid crystal lens element 20 is employed in an optical head device 70 of the sixth embodiment shown in FIG. 11, and carry out writing and reading optical disks of single layer and double layer for DVD.

In a case of writing or reading an information to/from an optical disk D of single layer for DVD having a cover thickness of 0.60 mm, using this optical device 70, when a voltage of about $V_0$=1.6 V is applied to the liquid crystal lens element 10, incident light is efficiently converged on an information recording layer by the objective lens 5.

For a double layer DVD optical disk D, when a voltage of about $V_{-1}$(=1 V) is applied to the liquid crystal lens element 20, incident light is converged on an information recording layer of a cover thickness of 0.63 mm, and when a voltage of about $V_{+1}$(=3 V) is applied, incident light is converged on an information recording layer of a cover thickness of 0.57 mm. In each case, residual RMS wavefront aberration is calculated to be at most 3 mλ [rms].

Figure 15:
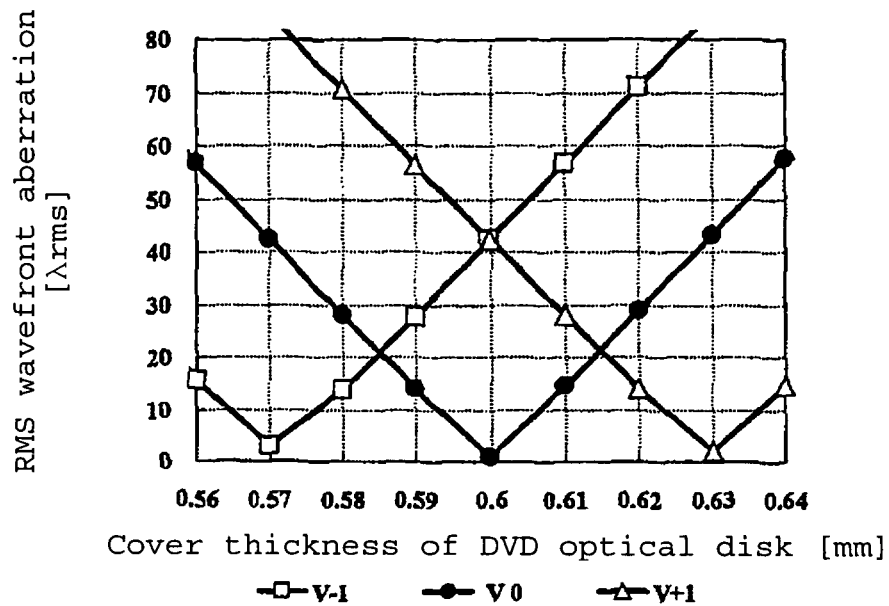
FIG. 15: A graph showing calculated data of wavefront aberration generated to DVD optical disks having different cover thickness, at a time of using an optical head device in which the liquid crystal lens element of the present invention is employed.
Figure 16:
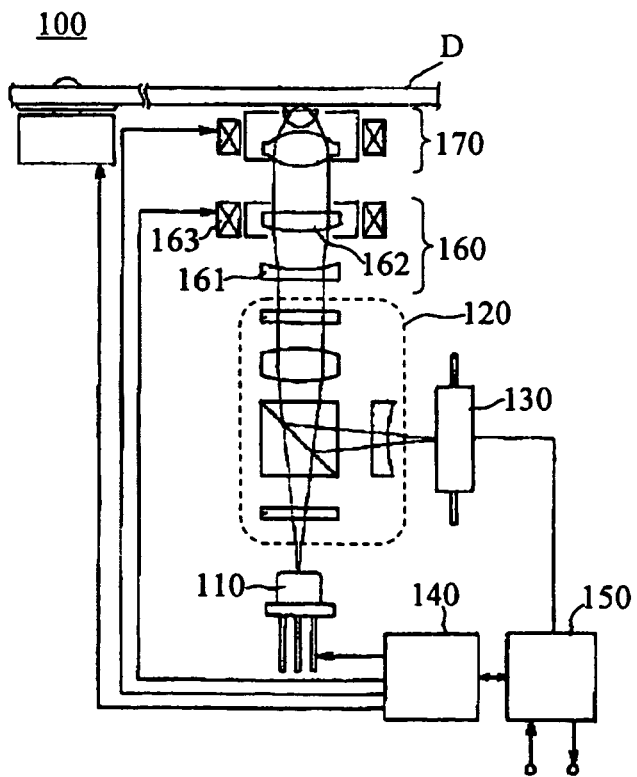
FIG. 16: A construction view showing a conventional optical head device employing a movable lens group as a spherical aberration correction element.
Figure 17:
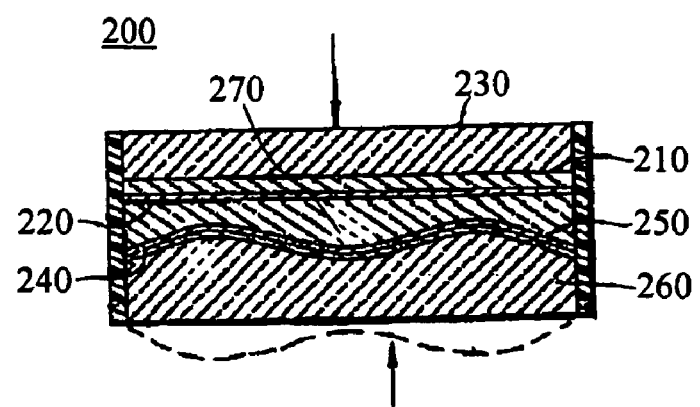
FIG. 17: A cross-sectional side view showing an example of the construction of a conventional liquid crystal lens.
Figure 18:
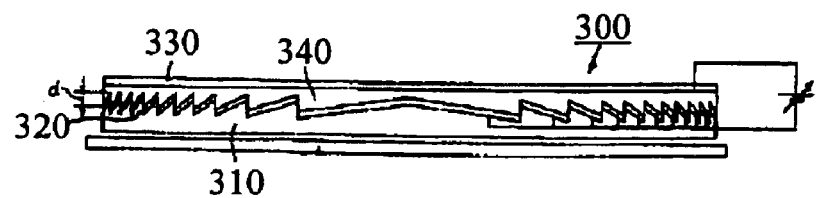
FIG. 18: A side view showing an example of the construction of a conventional liquid crystal diffraction lens.

Then, FIG. 15 shows a calculation result of residual RMS wavefront aberration in a case of using transmission wavefronts generated in response to applied voltages $V_0$, $V_{-1}$ and $V_{+1}$ for an optical disk having a cover thickness of from 0.56 mm to 0.64 mm.

Accordingly, when the cover thickness is within a range of from 0.56 mm to 0.585 mm, by applying a voltage $V_{+1}$, when the cover thickness is within a range of from 0.585 mm to 0.615 mm, by applying a voltage $V_0$, and when the cover thickness is within a range of from 0.615 mm to 0.64 mm, by applying a voltage $V_{-1}$, residual RMS wavefront aberration is reduced to be at most about 20 mλ [rms].

Further, when the objective lens 5 moves about ±0.3 mm in a radial direction of an optical disk D for tracking, an alignment error to the liquid crystal lens 20 occurs, but since no aberration is generated by the misalignment, no deterioration of converging spot is generated.

Accordingly, by switching an applied voltage among voltages $V_0$, $V_{-1}$ and $V_{+1}$ to the liquid crystal lens element 20, an optical head device is realized, which can stably write and read single layer and double layer DVD optical disks D.

Here, in a case where light of other wavelengths, for example, light of 790 nm wavelength band for CD, is incident into the liquid crystal lens element 20, by making such incident light linearly polarized light being ordinarily polarized light to the liquid crystal 16 of the liquid crystal lens element 20, no change occurs to a transmission wavefront at a time of no voltage application, and high transmittance is obtained, such being preferred.

INDUSTRIAL APPLICABILITY

The liquid crystal lens element of the present invention can be used as a lens for switching focal length, capable of switching a focal length among a plurality of focal lengths according to an applied voltage, in particular, the liquid crystal lens element can be used for the liquid crystal lens element for correcting a spherical aberration containing a power component generated at times of writing and/or reading optical disks having a single layer or a double layer information recording layer that have different cover thicknesses from each other, and since, no aberration is generated even if the liquid crystal lens element and an objective lens are misaligned to each other, limitation of positioning is reduced, and the element can be applied to e.g. an optical head device being a small-sized unit integrally formed with a light source, a photodetector and a beam splitter.

The entire disclosures of Japanese Patent Application No. 2004-026685 filed on Feb. 3, 2004 and Japanese Patent Application No. 2004-230606 filed on Aug. 6, 2004 including specifications, claims, drawings and summaries are incorporated herein by reference in their entireties.

What is claimed is:

1. A liquid crystal lens element having a variable focal length, comprising:
    a pair of transparent substrates each provided with a transparent electrode,
    voltage application means for applying voltage between the respective transparent electrodes provided on the pair of substrates,
    a concave-convex portion made of a transparent material and having a cross-section of saw-tooth shape or a cross-section of saw-tooth shape approximated by steps, that have rotational symmetry about an optical axis of the liquid crystal lens element, and formed on one of the transparent electrodes, and
    a liquid crystal filling at least concave portions of the concave-convex portion,
    wherein a substantial refractive index of the liquid crystal is changed according to the magnitude of the voltage applied between the transparent electrodes by the voltage application means,
    the liquid crystal has an ordinary refractive index $n_o$ and an extraordinary refractive index $n_e$ (here, $n_o \neq n_e$), the substantial refractive index of the liquid crystal layer changes within a range of from $n_o$ to $n_e$ according to the magnitude of the applied voltage, alignment direction of liquid crystal molecules at no voltage application is uniformly in a specific direction in the liquid crystal layer, and the transparent material of the concave-convex portion is a transparent material having a refractive index $n_s$ at least for extraordinarily polarized incident light, and the refractive index $n_s$ is a value between $n_o$ and $n_e$ (not containing cases where the value $n_s$ equals to $n_o$ or $n_e$), and
    the transparent material of the concave-convex portion has a refractive index $n_s$ satisfying the following formula:

$$|n_e - n_s| \leq |n_e - n_o|/2$$

and the concave-convex portion has concave portions having a depth d within the following formula at a wavelength $\lambda$ of light transmitted through the liquid crystal:

$$(m-0.25) \cdot \lambda / |n_e - n_s| \leq d \leq (m+0.25) \cdot \lambda / |n_e - n_s|$$

wherein m=1, 2 or 3 and m determines a number of switchable focal lengths of the liquid crystal lens element.

2. The liquid crystal lens element according to claim 1, which further comprises a phase plate having a phase difference of an odd number times of Π/2 for the light of wavelengths $\lambda$, integrated into the liquid crystal lens element.

3. A liquid crystal lens element comprising the liquid crystal lens element as defined in claim 1, and a phase plate laminated on the liquid crystal lens element.

4. A liquid crystal lens element comprising two liquid crystal lens elements as defined in claim 1 laminated together.

5. A liquid crystal lens element comprising the liquid crystal lens element as defined in claim 1, a polarizing diffraction element and a phase plate laminated together in this order.

6. An optical head device comprising a light source emitting light of wavelength $\lambda$, an objecting lens for converging light emitted from the light source on an optical recording medium, a beam splitter for separating light converged by the objective lens and reflected by the optical recording medium, and a photodetector for detecting the separated light, wherein the liquid crystal lens element as defined in claim 1, is disposed in an optical path between the light source and the objective lens.

7. An optical head device comprising a light source for emitting light of a wavelength $\lambda_1$ and a wavelength $\lambda_2$ (here, $\lambda_1 \neq \lambda_2$), an objective lens for converging the light emitted from the light source on an optical recording medium, a photodetector for detecting the light converged by the objective lens and reflected by the optical recording medium, wherein the liquid crystal lens element as defined in claim 1 is disposed in an optical path between the light source and the objective lens, and which uses linearly polarize light beams having polarization planes perpendicular to each other as the light of the wavelength $\lambda_1$ and the wavelength $\lambda_2$ incident into the liquid crystal lens element.

8. The optical head device according to claim 6, wherein the optical recording medium has a cover layer covering an information recording layer, and the optical head device carries out writing and/or reading of the optical recording mediums having the covering layers of different thicknesses from each other.

9. The optical head device according to claim 7, wherein the optical recording medium has a cover layer covering an information recording layer, and the optical head device carries out writing and/or reading of the optical recording mediums having the covering layers of different thicknesses from each other.

* * * * *